US008077172B2

(12) United States Patent
Kuroki et al.

(10) Patent No.: US 8,077,172 B2
(45) **Date of Patent: *Dec. 13, 2011**

(54) METHOD AND APPARATUS FOR PROCESSING AN IMAGE, IMAGE DISPLAY SYSTEM, STORAGE MEDIUM, AND PROGRAM

(75) Inventors: Yoshihiko Kuroki, Kanagawa (JP); Tomohiro Nishi, Tokyo (JP)

(73) Assignee: Sony Corporation, Tokyo (JP)

( * ) Notice: Subject to any disclaimer, the term of this patent is extended or adjusted under 35 U.S.C. 154(b) by 976 days.

This patent is subject to a terminal disclaimer.

(21) Appl. No.: 12/069,455

(22) Filed: Feb. 11, 2008

(65) Prior Publication Data

US 2008/0150931 A1 Jun. 26, 2008

Related U.S. Application Data

(63) Continuation of application No. 10/978,757, filed on Nov. 1, 2004, now Pat. No. 7,330,181.

(30) Foreign Application Priority Data

Oct. 31, 2003 (JP) ................................ 2003-372971

(51) Int. Cl.
*G09G 5/00* (2006.01)

(52) U.S. Cl. ....................................... 345/213; 345/204

(58) Field of Classification Search ............ 345/87–100, 345/204, 211–21; 348/14.15, 792, 800
See application file for complete search history.

(56) References Cited

U.S. PATENT DOCUMENTS 4,652,909 A 3/1987 Glenn
4,652,928 A 3/1987 Endo et al.
6,523,956 B2 2/2003 Oshima
6,661,579 B2 12/2003 Araki et al.
6,882,366 B1 4/2005 Kijima et al.
6,930,724 B1 8/2005 Tengeiji
7,015,954 B1 3/2006 Foote et al.
7,015,965 B2 * 3/2006 Asada et al. .................. 348/312
7,061,476 B2 6/2006 Fujiwara et al.
7,292,271 B2 11/2007 Okano et al.
7,330,181 B2 * 2/2008 Kuroki et al. ................. 345/213

(Continued)

FOREIGN PATENT DOCUMENTS

JP 04-068876 A 3/1992

(Continued)

*Primary Examiner* — Alexander S Beck
*Assistant Examiner* — Mansour M Said
(74) *Attorney, Agent, or Firm* — Wolf, Greenfield & Sacks, P.C.

(57) ABSTRACT

In an image display system, when a sequence of frames α, α+1, α+2, α+3, . . . , with a frame rate of m is given as an input video signal S1, a controller controls a frame memory to output a sequence of frames α, α+2, . . . , as an output video signal S2 at a frame rate of m/2 and a sequence of frames α+1, α+3, . . . , as an output video signal S3 at a frame rate of m/2 such that the timing of outputting each of frames α+1, α+3, . . . , of the output video signal S3 is delayed by 1/m with respect of the timing of outputting each of frames α, α+2, . . . , of the output video signal S2. By displaying the output video signals S3 and S2 in the above-described manner, a resultant motion image formed by a combination of the output video signals S3 and S2 is refreshed at an effective frame rate of m.

3 Claims, 20 Drawing Sheets

U.S. PATENT DOCUMENTS

| | | | | |
|---|---|---|---|---|
| 7,808,527 | B2 | 10/2010 | Kuroki | |
| 2001/0019363 | A1 | 9/2001 | Katta et al. | |
| 2003/0160886 | A1 | 8/2003 | Misawa et al. | |
| 2004/0086190 | A1 | 5/2004 | Kondo | |
| 2005/0093982 | A1 | 5/2005 | Kuroki | |
| 2009/0315875 | A1* | 12/2009 | Kuroki | 345/213 |

FOREIGN PATENT DOCUMENTS

| | | | |
|---|---|---|---|
| JP | 05-268579 | | 10/1993 |
| JP | 06-022256 | A | 1/1994 |
| JP | 06-043829 | A | 2/1994 |
| JP | 06-324320 | A | 11/1994 |
| JP | 07-004600 | A | 1/1995 |
| JP | 08-307753 | A | 11/1996 |
| JP | 10-124024 | | 5/1998 |
| JP | 10-191191 | | 7/1998 |
| JP | 11-164231 | A | 6/1999 |
| JP | 11-258565 | A | 9/1999 |
| JP | 2000-041223 | A | 2/2000 |
| JP | 2000-338941 | A | 12/2000 |
| JP | 2002-040584 | A | 2/2002 |
| JP | 2002-044011 | A | 2/2002 |
| JP | 2003-029238 | A | 1/2003 |

* cited by examiner

IMAGE DISPLAY SYSTEM
1
IMAGE SIGNAL CONVERTER
11
A/D CONVERTER
21
SYNCHRONIZATION SIGNAL DETECTOR
22
S1
FRAME MEMORY
23
CONTROLLER
24
DRIVE
28
31
32
33
34
S2
S3
D/A CONVERTER
25-1
D/A CONVERTER
25-2
DISPLAY CONTROLLER
27
SCAN CONTROLLER
41-1
SCAN CONTROLLER
41-2
DISPLAY
43
IMAGE DISPLAY
12

(X, Y) = (p, q)
51-1
51-2
SCAN A
SCAN B
C
(X, Y) = (0, 0)
β
52

INPUT VIDEO SIGNAL S1
OUTPUT VIDEO SIGNAL S2
OUTPUT VIDEO SIGNAL S3
OUTPUT VIDEO SIGNAL S4
FRAME α
FRAME α +1
FRAME α +2
FRAME α +3
FRAME α +4
FRAME α +5
FRAME α
FRAME α +3
FRAME α +1
FRAME α +4
FRAME α +2
1/m
2/m
3/m
4/m
5/m
6/m
7/m
TIME

1/60sec
TIME
POSITION
x
y
FIXED
VARYING WITH MOTION
VIEWING DIRECTION OF OBSERVER 1/120sec
POSITION
TIME
X
Y
VARYING WITH MOTION
FIXED
VIEWING DIRECTION OF OBSERVER

POSITION
TIME
X
Y
VARYING WITH MOTION
FIXED
VIEWING DIRECTION OF OBSERVER

POSITION
TIME
X
Y
VARYING WITH MOTION
FIXED
VIEWING DIRECTION OF OBSERVER

POSITION
TIME
X
Y
VARYING WITH MOTION
FIXED
VIEWING DIRECTION OF OBSERVER

INPUT VIDEO SIGNAL S1
OUTPUT VIDEO SIGNAL S2
OUTPUT VIDEO SIGNAL S3
OUTPUT VIDEO SIGNAL S4
OUTPUT VIDEO SIGNAL S5
FRAME α
FRAME α+1
FRAME α+2
FRAME α+3
FRAME α+4
FRAME α+5
FRAME α+6
FRAME α+7
FRAME α+8
FRAME α+9
FRAME α
FRAME α+4
FRAME α+1
FRAME α+5
FRAME α+2
FRAME α+6
FRAME α+3
FRAME α+7
1/m
2/m
3/m
4/m
5/m
6/m
7/m
8/m
9/m
10/m
11/m
TIME

METHOD AND APPARATUS FOR PROCESSING AN IMAGE, IMAGE DISPLAY SYSTEM, STORAGE MEDIUM, AND PROGRAM

CROSS REFERENCES TO RELATED APPLICATIONS

The present invention is a Continuation of U.S. application Ser. No. 10/978,757, filed Nov. 1, 2004 which, in turn, claims priority under 35 U.S.C. §119 to Japanese Patent Application No. JP 2003-372971, filed in the Japanese Patent Office on Oct. 31, 2003, the entire contents of which being incorporated herein by reference.

BACKGROUND OF THE INVENTION

1. Field of the Invention

The present invention relates to a method and apparatus for processing an image, an image display system, a storage medium, and a program, and more particularly to a method and apparatus for processing an image, an image display system, a storage medium, and a program, capable of smoothly displaying a motion image.

2. Description of the Related Art

There is a need for achieving improved image quality by improving a signal processing technique and/or a technique of driving a display device.

In general, an improvement in image quality is achieved by increasing the resolution of an image thereby achieving a finer image. The amount of information of an image is represented by the number of dots called pixels constituting the image. The number of pixels is represented in the form of the number of horizontal pixels by the number of vertical pixels. Specific examples are 800×600 and 1024×768. The greater the number of pixels (dots), the finer the image and the more the amount of information of the image.

To display an image with higher resolution, it is known to use two displays #1 and #2 such that a left-hand half part of the image is displayed on the display #1 and a right-hand half part of the image is displayed on the display #2 (in a multi mode) thereby achieving resolution twice the resolution achieved by using a single display #1 or #2 (in a single mode). A specific example of this technique may be found, for example, in Japanese Unexamined Patent Application Publication No. 10-124024.

If the resolution of an image is increased, the amount of information of the image increases. As a result, it becomes necessary to transmit a greater amount of data to the display #1 or #2, and thus it becomes necessary to increase the data transmission rate. In the system disclosed in the Japanese Unexamined Patent Application Publication No. 10-124024, to avoid the above problem, the data of each dot of the displays #1 and #2 is converted into a compressed form thereby reducing the amount of data of each dot, and the data in the compressed form is converted into an original form by means of signal processing, thereby making it possible to transmit image data without having to increase the data transmission rate.

For a motion image, the image quality can also be improved by increasing the frame rate, i.e., the number of times the image displayed on a screen is refreshed each second.

For example, when a motion image is displayed by projecting the image on a screen by using a projector, the projector scans each frame line by line in a horizontal direction. When scanning of one frame is completed, scanning of a next frame is started, and thus the motion image is displayed.

As described above, the image quality, in particular, the image quality of a motion image, can be improved by increasing the frame rate. However, to display an image at an increased frame rate, it is necessary to improve a driving circuit so as to be capable of driving a display device at an increased speed and it is also necessary to improve light modulation elements, which determine the intensity of the image, so as to respond at a higher speed. These requirements are difficult to achieve, and the achievement of the requirements results in an increase in cost.

In the case in which, using two displays, an image with resolution twice the resolution that can be achieved by using a single display is displayed, the technique of reducing the amount of data used for each dot of the display thereby making it unnecessary to increase the data transmission rate is already in practical use. However, this technique does not increase the frame rate at which a motion image is displayed. That is, even in a system capable of displaying a high-resolution image using two displays, to smoothly display a motion image, it is still required to increase the operating speed of the driving circuit for driving the displays and increase the response speed of light modulation elements.

SUMMARY OF THE INVENTION

In view of the above, it is an object of the present invention to provide a technique of displaying a motion image with improved image quality without having to increase the operating speed of a driving circuit for driving a display device.

According to an aspect, the present invention provides an image processing apparatus comprising storage means for storing a supplied image signal with a first frame rate, output control means for controlling outputting of the image signal stored in the storage means to a plurality of image display apparatuses or a plurality of image signal display processing units disposed in an image display apparatus, and display control means for controlling displaying of an image corresponding to the image signal output under the control of the output control means, wherein, in a case in which there are provided at least n image display apparatuses or display processing units disposed in an image display apparatus, the output control means controls the outputting of the image signal such that the image signal is output frame by frame from the storage means at a second frame rate equal to 1/n of the first frame rate to the n image display apparatuses or display processing units, and the display control means controls the displaying of images corresponding to the image signals output to the n image display apparatuses under the control of the output control means such that images corresponding to the image signals output to the n image display apparatuses are displayed in turn in a dot-sequential or line-sequential manner while the display start timing is shifted from one frame to another by 1/n of one scanning period at the second frame rate.

The image processing apparatus according to the present invention may further comprise detection means for detecting a synchronization signal of the image signal with the first frame rate, wherein the output control means may control outputting of the image signal on the basis of the synchronization signal detected by the detection means.

The image processing apparatus according to the present invention may further comprise digital signal conversion means for converting the image signal with the first frame rate into a digital signal, and a plurality of analog signal conversion means for converting the image signals with the second frame rate, whose output is controlled by the output control means, into analog signals.

In the image processing apparatus according to the present invention, the first frame rate may be 240 Hz, the second frame rate may be 60 Hz, there may be provided at least four image display apparatuses or display processing units disposed in a image display apparatus, and the output control means may control the outputting of the image signal such that the image signal is output frame by frame to the four image display apparatuses or display processing units at a frame rate equal to ¼ of 240 Hz, i.e., at a frame rate of 60 Hz.

In the image processing apparatus according to the present invention, the first frame rate may be 250 Hz, the second frame rate may be 50 Hz, there may be provided at least five image display apparatuses or display processing units disposed in a image display apparatus, and the output control means may control the outputting of the image signal such that the image signal is output frame by frame to the five image display apparatuses or display processing units at a frame rate equal to ⅕ of 250 Hz, i.e., at a frame rate of 50 Hz.

In the image processing apparatus according to the present invention, the first frame rate may be 180 Hz, the second frame rate may be 60 Hz, there may be provided at least three image display apparatuses or display processing units disposed in a image display apparatus, and the output control means may control the outputting of the image signal such that the image signal is output frame by frame to the three image display apparatuses or display processing units at a frame rate equal to ⅓ of 180 Hz, i.e., at a frame rate of 60 Hz.

In the image processing apparatus according to the present invention, the first frame rate may be 150 Hz, the second frame rate may be 50 Hz, there may be provided at least three image display apparatuses or display processing units disposed in a image display apparatus, and the output control means may control the outputting of the image signal such that the image signal is output frame by frame to the three image display apparatuses or display processing units at a frame rate equal to ⅓ of 150 Hz, i.e., at a frame rate of 50 Hz.

According to another aspect, the present invention provides an image processing method comprising a storage control step of controlling storing of an image signal with a first frame rate into the storage unit, an output control step of controlling outputting of the image signal, stored in the storage unit in the storage control step, to a plurality of image display apparatuses or a plurality of image signal display processing units disposed in an image display apparatus, and a display control step of controlling displaying of an image corresponding to the image signal whose output is controlled in the output control step, wherein, in a case in which there are provided at least n image display apparatuses or display processing units disposed in an image display apparatus, in the output control step, the outputting of the image signal is controlled such that the image signal is output frame by frame from the storage unit at a second frame rate equal to 1/n of the first frame rate to the n image display apparatuses or display processing units, and in the display control step, the displaying of images corresponding to the image signals output to the n image display apparatuses or the n display processing units in the output control step is controlled such that images corresponding to the image signals output to the n image display apparatuses or the n display processing units are displayed in turn in a dot-sequential or line-sequential manner while the display start timing is shifted from one frame to another by 1/n of one scanning period at the second frame rate.

In another aspect, the present invention provides a storage medium on which a program is stored, the program comprising a storage control step of controlling storing of an image signal with a first frame rate into the storage unit, an output control step of controlling outputting of the image signal, stored in the storage unit in the storage control step, to a plurality of image display apparatuses or a plurality of image signal display processing units disposed in an image display apparatus, and a display control step of controlling displaying of an image corresponding to the image signal whose output is controlled in the output control step, wherein, in a case in which there are provided at least n image display apparatuses or display processing units disposed in an image display apparatus, in the output control step, the outputting of the image signal is controlled such that the image signal is output frame by frame from the storage unit at a second frame rate equal to 1/n of the first frame rate to the n image display apparatuses or display processing units, and in the display control step, the displaying of images corresponding to the image signals output to the n image display apparatuses or the n display processing units in the output control step is controlled such that images corresponding to the image signals output to the n image display apparatuses or the n display processing units are displayed in turn in a dot-sequential or line-sequential manner while the display start timing is shifted from one frame to another by 1/n of one scanning period at the second frame rate.

In another aspect, the present invention provides a program comprising a storage control step of controlling storing of an image signal with a first frame rate into the storage unit, an output control step of controlling outputting of the image signal, stored in the storage unit in the storage control step, to a plurality of image display apparatuses or a plurality of image signal display processing units disposed in an image display apparatus, and a display control step of controlling displaying of an image corresponding to the image signal whose output is controlled in the output control step, wherein, in a case in which there are provided at least n image display apparatuses or display processing units disposed in an image display apparatus, in the output control step, the outputting of the image signal is controlled such that the image signal is output frame by frame from the storage unit at a second frame rate equal to 1/n of the first frame rate to the n image display apparatuses or display processing units, and in the display control step, the displaying of images corresponding to the image signals output to the n image display apparatuses or the n display processing units in the output control step is controlled such that images corresponding to the image signals output to the n image display apparatuses or the n display processing units are displayed in turn in a dot-sequential or line-sequential manner while the display start timing is shifted from one frame to another by 1/n of one scanning period at the second frame rate.

In another aspect, the present invention provides an image display system comprising an image processing apparatus and an image display apparatus, wherein the image processing apparatus comprises storage means for storing a supplied image signal with a first frame rate, output control means for controlling outputting of the image signal stored in the storage means to the image display apparatus, and display control means for controlling displaying, by the image display apparatus, of an image corresponding to the image signal output under the control of the output control means, the image display apparatus comprises a plurality of image display processing means for rendering an image in a dot-sequential or a line-sequential form, and display means for displaying the image rendered by the image display processing means, there are provided at least n image display processing means, the output control means controls the outputting of the image signal such that the image signal is output frame by frame at a second frame rate equal to 1/n of the first frame rate to the n image display processing means, and the display control means controls the displaying of images corresponding to the image signals output to the n image display processing means under the control of the output control means such that images corresponding to the image signals output to the n image display processing means are displayed in turn in a dot-sequential or line-sequential manner while the display start timing is shifted from one frame to anther by 1/n of one scanning period at the second frame rate.

In this image display system according to the present invention, the plurality of image display processing means may perform the rendering such that the position error among corresponding n pixels of the image displayed by the display means according to the image signal supplied from the image processing apparatus is less than one pixel width.

In this image display system according to the present invention, the first frame rate may be 240 Hz, the second frame rate may be 60 Hz, there may be provided at least four image display processing means, and the output control means may control the outputting of the image signal such that the image signal is output frame by frame to the four image display processing means at a frame rate equal to ¼ of 240 Hz, i.e., at a frame rate of 60 Hz.

In this image display system according to the present invention, the first frame rate may be 250 Hz, the second frame rate may be 50 Hz, there may be provided at least five image display processing means, and the output control means may control the outputting of the image signal such that the image signal is output frame by frame to the five image display processing means at a frame rate equal to ⅕ of 250 Hz, i.e., at a frame rate of 50 Hz.

In this image display system according to the present invention, the first frame rate may be 180 Hz, the second frame rate may be 60 Hz, there may be provided at least three image display processing means, and the output control means may control the outputting of the image signal such that the image signal is output frame by frame at a frame rate equal to ⅓ of 180 Hz, i.e., at a frame rate of 60 Hz to the three image display processing means.

In this image display system according to the present invention, the first frame rate may be 150 Hz, the second frame rate may be 50 Hz, there may be provided at least three image display processing means, and the output control means may control the outputting of the image signal such that the image signal is output frame by frame at a frame rate equal to ⅓ of 150 Hz, i.e., at a frame rate of 50 Hz to the three image display processing means.

In another aspect, the present invention provides an image display system comprising an image processing apparatus and a plurality of image display apparatuses, wherein the image processing apparatus comprises storage means for storing a supplied image signal with a first frame rate; output control means for controlling outputting of the image signal stored in the storage means to the image display apparatus, and display control means for controlling displaying of an image corresponding to the image signal output under the control of the output control means, each image display apparatus comprises image display processing means for rendering an image in a dot-sequential or a line-sequential form, there are provided at least n image display apparatus, the output control means controls the outputting of the image signal such that the image signal is output frame by frame at a second frame rate equal to 1/n of the first frame rate to the n image display apparatus, and the display control means controls the displaying of images corresponding to the image signals output to the n image display apparatuses under the control of the output control means such that images corresponding to the image signals output to the n image display apparatuses are displayed in turn in a dot-sequential or line-sequential manner while the display start timing is shifted from one frame to another by 1/n of one scanning period at the second frame rate.

In this image display system according to the present invention, each image display apparatus may be a projector for forming the image by means of projection.

In this image display system according to the present invention, the plurality of image display processing means may perform the rendering such that the position error among corresponding n pixels of the image signal supplied from the image processing apparatus is less than one pixel width.

In this image display system according to the present invention, the first frame rate may be 240 Hz, the second frame rate may be 60 Hz, there may be provided at least four image display apparatuses, and the output control means may control the outputting of the image signal such that the image signal is output frame by frame to the four image display apparatuses at a frame rate equal to ¼ of 240 Hz, i.e., at a frame rate of 60 Hz.

In this image display system according to the present invention, the first frame rate may be 250 Hz, the second frame rate may be 50 Hz, there may be provided at least five image display apparatuses, and the output control means may control the outputting of the image signal such that the image signal is output frame by frame at a frame rate equal to ⅕ of 250 Hz, i.e., at a frame rate of 50 Hz to the five image display apparatuses.

In this image display system according to the present invention, the first frame rate may be 180 Hz, the second frame rate may be 60 Hz, there may be provided at least three image display apparatuses, and the output control means may control the outputting of the image signal such that the image signal is output frame by frame at a frame rate equal to ⅓ of 180 Hz, i.e., at a frame rate of 60 Hz to the three image display apparatuses.

In this image display system according to the present invention, the first frame rate may be 150 Hz, the second frame rate may be 50 Hz, there may be provided at least three image display apparatuses, and the output control means may control the outputting of the image signal such that the image signal is output frame by frame at a frame rate equal to ⅓ of 150 Hz, i.e., at a frame rate of 50 Hz to the three image display apparatuses.

In the image processing apparatus, the image processing method, the program, and the image processing system described above, an image signal with the first frame rate is stored, and the stored image signal is output frame by frame to n or more image display apparatuses or n or more display processing units disposed in an image display apparatus at a second frame rate equal to 1/n of the first frame rate, and displaying the image corresponding to the image signal is controlled such that each frame is scanned in a dot-sequential or line-sequential manner while shifting the scan start timing frame by frame by a time equal to 1/n of a time needed to scan one full frame at the second frame rate thereby displaying the image corresponding to the image signal.

In another aspect, the present invention provides an image processing apparatus comprising separation means for separating a supplied image signal with a first frame rate into a plurality of sub image signals on a frame-by-frame basis, a plurality of storage means for storing the respective separate sub image signals output by the separation means, output control means for controlling outputting of the respective sub image signals stored in the plurality of storage means to a plurality of image display apparatuses or a plurality of image signal display processing units disposed in an image display apparatus, and display control means for controlling displaying of an image corresponding to an overall image signal formed by all sub image signals whose output is controlled by the output control means, wherein, in a case in which there are provided at least n image display apparatuses or display processing units, the separation means separates the image signal into n sub image signals, there are provided n storage means, the output control means controls the outputting of the sub image signals such that the sub image signals are output frame by frame from the respective n storage means at a second frame rate equal to 1/n of the first frame rate to the n image display apparatuses or display processing units, and the display control means controls the displaying of an image corresponding to an image signal made up of all sub image signals output to the n image display apparatuses or display processing units under the control of the output control means such that images corresponding to the sub image signals output to the n image display apparatuses or display processing units are displayed in turn in a dot-sequential or line-sequential manner while the display start timing is shifted from one frame to another by 1/n of one scanning period at the second frame rate.

The image processing apparatus according to the present invention may further comprise detection means for detecting a synchronization signal of the image signal with the first frame rate, wherein the output control means may control outputting of the image signal on the basis of the synchronization signal detected by the detection means.

The image processing apparatus according to the present invention may further comprise digital signal conversion means for converting the image signal with the first frame rate into a digital signal, and a plurality of analog signal conversion means for converting the sub image signals with the second frame rate, whose output is controlled by the output control means, into analog signals.

In this image processing apparatus according to the present invention, the first frame rate may be 240 Hz, the second frame rate may be 60 Hz, there may be provided at least four image display apparatuses or display processing units, the separation means may separate the image signal into four sub image signals, there may be provided four storage means, and the output control means may control the outputting of the sub image signals such that the sub image signals are output frame by frame from the respective four storage means at a frame rate of 60 Hz to the four image display apparatuses or display processing units.

In this image processing apparatus according to the present invention, the first frame rate may be 250 Hz, the second frame rate may be 50 Hz, there may be provided at least five image display apparatuses or display processing units, the separation means may separate the image signal into five sub image signals, there may be provided five storage means, and the output control means may control the outputting of the sub image signals such that the sub image signals are output frame by frame from the respective five storage means at a frame rate of 50 Hz to the five image display apparatuses or display processing units.

In this image processing apparatus according to the present invention, the first frame rate may be 180 Hz, the second frame rate may be 60 Hz, there may be provided at least three image display apparatuses or display processing units, the separation means may separate the image signal into three sub image signals, there may be provided three storage means, and the output control means may control the outputting of the sub image signals such that the sub image signals are output frame by frame from the respective three storage means at a frame rate of 60 Hz to the three image display apparatuses or display processing units.

In this image processing apparatus according to the present invention, the first frame rate may be 150 Hz, the second frame rate may be 50 Hz, there may be provided at least three image display apparatuses or display processing units, the separation means may separate the image signal into three sub image signals, there may be provided three storage means, and the output control means may control the outputting of the sub image signals such that the sub image signals are output frame by frame from the respective three storage means at a frame rate of 50 Hz to the three image display apparatuses or display processing units.

In another aspect, the present invention provides an image processing method comprising a separation step of separating a supplied image signal with a first frame rate into a plurality of sub image signals on a frame-by-frame basis, a storage control step of controlling storing of the respective separate sub image signals, output in the separation step, into a plurality storage units, an output control step of controlling outputting of the respective sub image signals, stored in the storage units in the storage control step, to a plurality of image display apparatuses or a plurality of image signal display processing units disposed in an image display apparatus, and a display control step of controlling displaying of an image corresponding to an overall image signal formed by all sub image signals whose output is controlled in the output control step, wherein, in a case in which there are provided at least n image display apparatuses or display processing units, in the separation step, the image signal is separated into n sub image signals, there are provided n storage means, in the output control step, the outputting of the sub image signals stored in the n storage means in the storage control step is controlled such that the sub image signals are output frame by frame from the respective n storage means at a second frame rate equal to 1/n of the first frame rate to the n image display apparatuses or display processing units, and in the display control step, the displaying of an image corresponding to an image signal made up of all sub image signals output to the n image display apparatuses or display processing units in the output control step is controlled such that images corresponding to the sub image signals output to the n image display apparatuses or display processing units are displayed in turn in a dot-sequential or line-sequential manner while the display start timing is shifted from one frame to another by 1/n of one scanning period at the second frame rate.

In another aspect, the present invention provides a storage medium on which a program is stored, the program comprising a separation step of separating a supplied image signal with a first frame rate into a plurality of sub image signals on a frame-by-frame basis, a storage control step of controlling storing of the respective separate sub image signals, output in the separation step, into a plurality storage units, an output control step of controlling outputting of the respective sub image signals, stored in the storage units in the storage control step, to a plurality of image display apparatuses or a plurality of image signal display processing units disposed in an image display apparatus, and a display control step of controlling displaying of an image corresponding to an overall image signal formed by all sub image signals whose output is controlled in the output control step, wherein, in a case in which there are provided at least n image display apparatuses or display processing units, in the separation step, the image signal is separated into n sub image signals, there are provided n storage means, in the output control step, the outputting of the sub image signals stored in the n storage means in the storage control step is controlled such that the sub image signals are output frame by frame from the respective n storage means at a second frame rate equal to 1/n of the first frame rate to the n image display apparatuses or display processing units, and in the display control step, the displaying of an image corresponding to an image signal made up of all sub image signals output to the n image display apparatuses or display processing units in the output control step is controlled such that images corresponding to the sub image signals output to the n image display apparatuses or display processing units are displayed in turn in a dot-sequential or line-sequential manner while the display start timing is shifted from one frame to another by 1/n of one scanning period at the second frame rate.

In another aspect, the present invention provides a program comprising a separation step of separating a supplied image signal with a first frame rate into a plurality of sub image signals on a frame-by-frame basis, a storage control step of controlling storing of the respective separate sub image signals, output in the separation step, into a plurality storage units, an output control step of controlling outputting of the respective sub image signals, stored in the storage units in the storage control step, to a plurality of image display apparatuses or a plurality of image signal display processing units disposed in an image display apparatus, and a display control step of controlling displaying of an image corresponding to an overall image signal formed by all sub image signals whose output is controlled in the output control step, wherein, in a case in which there are provided at least n image display apparatuses or display processing units, in the separation step, the image signal is separated into n sub image signals, there are provided n storage means, in the output control step, the outputting of the sub image signals stored in the n storage means in the storage control step is controlled such that the sub image signals are output frame by frame from the respective n storage means at a second frame rate equal to 1/n of the first frame rate to the n image display apparatuses or display processing units, and in the display control step, the displaying of an image corresponding to an image signal made up of all sub image signals output to the n image display apparatuses or display processing units in the output control step is controlled such that images corresponding to the sub image signals output to the n image display apparatuses or display processing units are displayed in turn in a dot-sequential or line-sequential manner while the display start timing is shifted from one frame to another by 1/n of one scanning period at the second frame rate.

In another aspect, the present invention provides an image display system comprising an image processing apparatus and an image display apparatus, wherein the image processing apparatus comprises separation means for separating a supplied image signal with a first frame rate into a plurality of sub image signals on a frame-by-frame basis, a plurality of storage means for storing the respective separate sub image signals output by the separation means, output control means for controlling outputting of the respective sub image signals stored in the plurality of storage means to the image display apparatus, and display control means for controlling displaying of an image corresponding to an overall image signal formed by all sub image signals whose output is controlled by the output control means, the image display apparatus comprises a plurality of image display processing means for rendering an image in a dot-sequential or a line-sequential form, and display means for displaying the image rendered by the image display processing means, there are provided at least n image display processing means, the separation means separates the image signal into n sub image signals, there are provided n storage means, the output control means controls the outputting of the sub image signals such that the sub image signals are output frame by frame from the respective n storage means at a second frame rate equal to 1/n of the first frame rate to the n image display processing means, and the display control means controls the displaying of images corresponding to the image signals output to the n image display processing means under the control of the output control means such that images corresponding to the image signals output to the n image display processing means are displayed on the display means in turn in a dot-sequential or line-sequential manner while the display start timing is shifted from one frame to another by 1/n of one scanning period at the second frame rate.

In this image display system according to the present invention, the plurality of image display processing means may perform the rendering such that the position error among corresponding n pixels of the image displayed by the display means according to the image signal supplied from the image processing apparatus is less than one pixel width.

In this image display system according to the present invention, the first frame rate may be 240 Hz, the second frame rate may be 60 Hz, there may be provided at least four image display processing means, and the separation means may separate the image signal into four sub image signals, there may be provided four storage means, and the output control means may control the outputting of the sub image signals such that the sub image signals are output frame by frame from the respective four storage means at a frame rate of 60 Hz to the four image display processing means.

In this image display system according to the present invention, the first frame rate may be 250 Hz, the second frame rate may be 50 Hz, there may be provided at least five image display processing means, and the separation means may separate the image signal into five sub image signals, there may be provided five storage means, and the output control means may control the outputting of the sub image signals such that the sub image signals are output frame by frame from the respective five storage means at a frame rate of 50 Hz to the five image display processing means.

In this image display system according to the present invention, the first frame rate may be 180 Hz, the second frame rate may be 60 Hz, there may be provided at least three image display processing means, and the separation means may separate the image signal into three sub image signals, there may be provided three storage means, and the output control means may control the outputting of the sub image signals such that the sub image signals are output frame by frame from the respective three storage means at a frame rate of 60 Hz to the three image display processing means.

In this image display system according to the present invention, the first frame rate may be 150 Hz, the second frame rate may be 50 Hz, there may be provided at least three image display processing means, and the separation means may separate the image signal into three sub image signals, there may be provided three storage means, and the output control means may control the outputting of the sub image signals such that the sub image signals are output frame by frame from the respective three storage means at a frame rate of 50 Hz to the three image display processing means.

In another aspect, the present invention provides an image display system comprising an image processing apparatus and a plurality of image display apparatuses, wherein the image processing apparatus comprises separation means for separating a supplied image signal with a first frame rate into a plurality of sub image signals on a frame-by-frame basis, a plurality of storage means for storing the respective separate sub image signals output by the separation means, output control means for controlling outputting of the respective sub image signals stored in the plurality of storage means to the image display apparatus, and display control means for controlling displaying of an image corresponding to an overall image signal formed by all sub image signals whose output is controlled by the output control means, each image display apparatus comprises image display processing means for rendering an image in a dot-sequential or a line-sequential form, there are provided at least n image display apparatus, the separation means separates the image signal into n sub image signals, there are provided n storage means, the output control means controls the outputting of the sub image signals such that the sub image signals are output frame by frame from the respective n storage means at a second frame rate equal to 1/n of the first frame rate to the n image display apparatus, and the display control means controls the displaying of an image corresponding to an image signal made up of all sub image signals output to the n image display apparatuses under the control of the output control means such that images corresponding to the sub image signals output to the n image display apparatuses are displayed in turn in a dot-sequential or line-sequential manner while the display start timing is shifted from one frame to another by 1/n of one scanning period at the second frame rate.

In this image display system according to the present invention, each image display apparatus may be a projector for forming the image by means of projection.

In this image display system according to the present invention, the plurality of image display processing means may perform the rendering such that the position error among corresponding n pixels of the image signal supplied from the image processing apparatus is less than one pixel width.

In this image display system according to the present invention, the first frame rate may be 240 Hz, the second frame rate may be 60 Hz, there may be provided at least four image display apparatuses, and the separation means may separate the image signal into four sub image signals, there may be provided four storage means, and the output control means may control the outputting of the sub image signals such that the sub image signals are output frame by frame from the respective four storage means at a frame rate of 60 Hz to the four image display apparatuses.

In this image display system according to the present invention, the first frame rate may be 250 Hz, the second frame rate may be 50 Hz, there may be provided at least—five image display apparatuses, and the separation means may separate the image signal into five sub image signals, there may be provided five storage means, and the output control means may control the outputting of the sub image signals such that the sub image signals are output frame by frame from the respective five storage means at a frame rate of 50 Hz to the five image display apparatuses.

In this image display system according to the present invention, the first frame rate may be 180 Hz, the second frame rate may be 60 Hz, there may be provided at least three image display apparatuses, and the separation means may separate the image signal into three sub image signals, there may be provided three storage means, and the output control means may control the outputting of the sub image signals such that the sub image signals are output frame by frame from the respective three storage means at a frame rate of 60 Hz to the three image display apparatuses.

In this image display system according to the present invention, the first frame rate may be 150 Hz, the second frame rate may be 50 Hz, there may be provided at least three image display apparatuses, and the separation means may separate the image signal into three sub image signals, there may be provided three storage means, and the output control means may control the outputting of the sub image signals such that the sub image signals are output frame by frame from the respective three storage means at a frame rate of 50 Hz to the three image display apparatuses.

In the image processing apparatus, the image processing method, the program, and the image processing system described above, the image signal with the first frame rate is separated frame by frame into n sub image signals, the separated sub image signals are stored, and the stored sub image signals are output frame by frame to n or more image display apparatuses or n or more display processing units disposed in an image display apparatus at a second frame rate equal to 1/n of the first frame rate and displaying the image corresponding to an image signal made up of all sub image signals controlled such that each frame is scanned in a dot-sequential or line-sequential manner while shifting the scan start timing frame by frame by a time equal to 1/n of a time needed to scan one full frame at the second frame rate thereby displaying the image corresponding to the image signal.

An image signal to be used in displaying an image is processed in the above-described manner in accordance with the present invention. More particularly, the given input image signal is converted into image signals and supplied to respective n display devices such as projectors thereby making it possible to display a motion image at an effective frame rate that is n times greater than the frame rate that can be achieved by a single display device.

According to the present invention, the given input display signal is output to n display devices thereby displaying a motion image at a frame rate that is n times greater than the frame rate that can be achieved by a single display device.

DESCRIPTION OF THE PREFERRED EMBODIMENTS

The present invention is described in further detail below with reference to specific embodiments in conjunction with the accompanying drawings.

Figure 1:
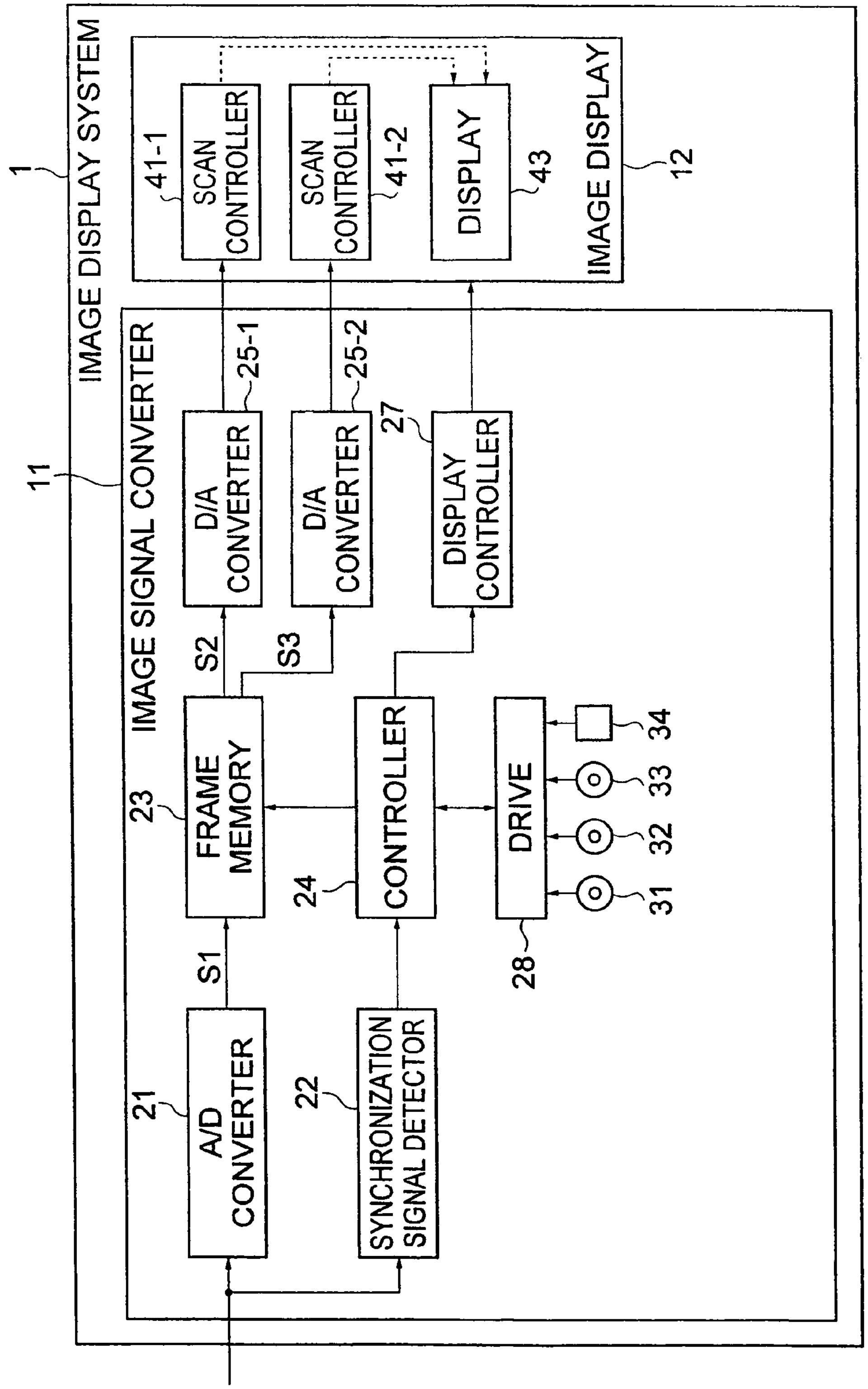
FIG. 1 is a block diagram showing an example of a configuration of an image display system according to the present invention.

FIG. 1 is a block diagram showing an example of a configuration of an image display system 1 according to the present invention. The image display system 1 includes an image signal converter 11, and an image display apparatus 12. In the image display system 1, upon receiving an analog image signal of a motion image, the image signal converter 11 processes the image signal and supplies the resultant image signal to the image display apparatus 12 which in turn displays the motion image.

In the image signal converter 11, the input analog image signal is supplied to an analog-to-digital converter 21 and a synchronization signal detector 22.

The analog-to-digital converter 21 converts the analog image signal with a frame rate m into a digital image signal and supplies the resultant digital image signal to a frame memory 23. The synchronization signal detector 22 detects a frame rate and a dot clock of the image signal from the image signal and generates a vertical synchronization signal and a dot clock signal. The generated vertical synchronization signal and dot clock signal are supplied to a controller 24. The dot clock refers to the reciprocal of a time needed to display one dot on a display.

In accordance with the vertical synchronization signal and the dot clock signal received from the synchronization signal detector 22, the controller 24 controls outputting of a video signal from the frame memory 23 and supplies information associated with the output of the video signal from the frame memory 23 to a display controller 27. Under the control of the controller 24, the frame memory 23 supplies the received digital image signal to a digital-to-analog converter 25-1 or a digital-to-analog converter 25-2.

Figure 2:
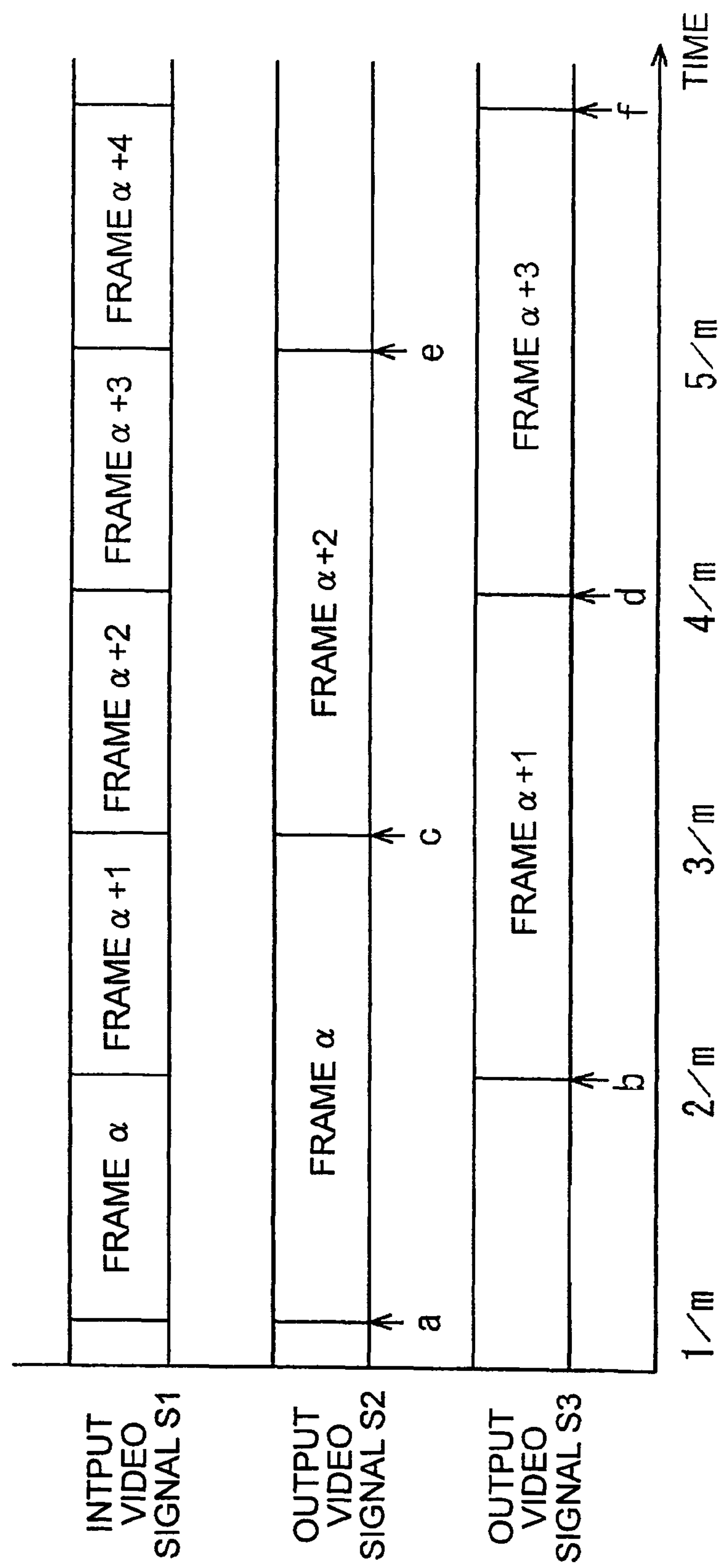
FIG. 2 is a diagram showing timings of an input video signal and output video signals.

Referring to FIG. 2, the operation of inputting and outputting of a video signal to or from the frame memory 23, performed by the controller 24, is described below.

Let m denote the frame rate of a video signal S1 input to the frame memory 23. Herein, we assume that frames α, α+1, α+2, and so on are sequentially input to the frame memory 23. When a frame α and a frame α+1 are successively input to the frame memory 23, the controller 24 controls the frame memory 23 such that the frame α is output as a output video signal S2 to the digital-to-analog converter 25-1 at a frame rate equal to ½ of the frame rate of the input video signal S1, that is, at a frame rate of m/2, and such that the frame α+1 is output as a output video signal S3 to the digital-to-analog converter 25-2 wherein the output of the frame α+1 is started at a time b delayed by 1/m with respect to the time a at which the output of the frame α is started.

The period during which the frame α is supplied to the digital-to-analog converter 25-1 is equal to 2/m, and the supplying of the frame a ends at a time c that is 1/m after the supply start time b of the frame α+1 to the digital-to-analog converter 25-2. Following the frame α+1, a frame α+2 and a frame α+3 are sequentially input to the frame memory 23. The controller 24 controls the frame memory 23 such that the frame α+2 is supplied as an output video signal S2 to the digital-to-analog converter 25-1 at a frame rate equal to ½ of the frame rate of the input video signal S1, immediately following the end of the frame α (that is, the supplying of the frame α+2 starts at time c). Similarly, the controller 24 supplies the frame α+3 as an output video signal S3 to the digital-to-analog converter 25-2 such that the supplying of the frame α+3 starts at a time d, which is 1/m after the supply start time c of the frame α+2, immediately following the end of the frame α+1.

The timings of supplying the output video signal S2 and the output video signal S3, which are shifted from each other, are determined by a vertical synchronization signal of the input video signal S1. That is, as shown in FIG. 2, the interval between adjacent supply start times a to f, at which supplying of either a frame of the output video signal S2 or a frame of the output video signal S3 is started, is equal to the period of one frame of the input video signal S1. On the basis of the vertical synchronization signal supplied from the synchronization signal detector 22, the controller 24 controls the timing of supplying the output video signal S2 to the digital-to-analog converter 25-1 and the timing of supplying the output video signal S3 to the digital-to-analog converter 25-2.

As described above, the controller 24 controls the frame memory 23 such that the output video signal S2 and the output video signal S3 are supplied frame by frame to the digital-to-analog converter 25-1 and the digital-to-analog converter 25-2, respectively, at the frame rate m/2 equal to ½ of the frame rate m of the input video signal S1 and such that the supply start time for the output video signal S2 and the supply start time for the output video signal S3 are shifted from each other by a period (1/m) equal to ½ of the period (2/m) during which one frame is supplied.

Referring again to FIG. 1, the image display system 1 is further described.

The digital-to-analog converter 25-1 converts the supplied digital image signal into an analog image signal and supplies the resultant analog image signal to a scan controller 41-1 of an image display apparatus 12. The digital-to-analog converter 25-2 converts the supplied digital image signal into an analog image signal and supplies the resultant analog image signal to a scan controller 41-2 of the image display apparatus 12.

On the basis of information supplied from the controller 24, the display controller 27 controls the image display device 12 to display a motion image in a similar manner as with the output video signals S2 and S3 described above with reference to FIG. 2.

As described above with reference to FIG. 2, the frame rate of the output video signal S2 and the output video signal S3 is equal to ½ of the frame rate of the input video signal S1. That is, the dot clock of the output video signal S2 and the output video signal S3 is equal to ½ of the dot clock of the input video signal S1. On the basis of information associated with the video signal output from the frame memory 23, supplied by the controller 24, the display controller 27 controls displaying the image such that the dot clock of the output video signal S2 and the output video signal S3 displayed by the image display device 12 becomes equal to ½ of the dot clock of the input video signal S1.

As required, a drive 28 is connected with the controller 24. On the drive 28, a storage medium such as a magnetic disk 31, an optical disk 32, a magneto-optical disk 33, or a semiconductor memory 34 is mounted so that the controller 24 can read or store information from or in the storage medium mounted on the drive 28.

If the image display device 12 receives the two analog video signals from the image signal converter 11, the image display device 12 displays, under the control of the display controller 27, a motion image on a display unit 43 by using the scan controller 41-1 and the scan controller 41-2.

The analog signal, corresponding to the output video signal S2 output from the frame memory 23 at the timings described above with reference to FIG. 2 and converted into analog form by the digital-to-analog converter 25-1, is supplied to the scan controller 41-1. Similarly, the analog signal, corresponding to the output video signal S3 output from the frame memory 23 at the timings described above with reference to FIG. 2 and converted into analog form by the digital-to-analog converter 25-2, is supplied to the scan controller 41-2.

The scan controller 41-1 and the scan controller 41-2 display the respective supplied analog video signals by the display unit 43 in a dot-sequential or line-sequential manner. In this display control process, the scan controller 41-1 and the scan controller 41-2 alternately scan successive frames such that the scan start timing is shifted from each other by an amount corresponding to ½ of one frame, thereby displaying the image on the display unit 43 at an effective frame rate twice the frame rate at which the scanning is performed by the single scan controller 41-1 or the scan controller 41-2.

Figure 3:
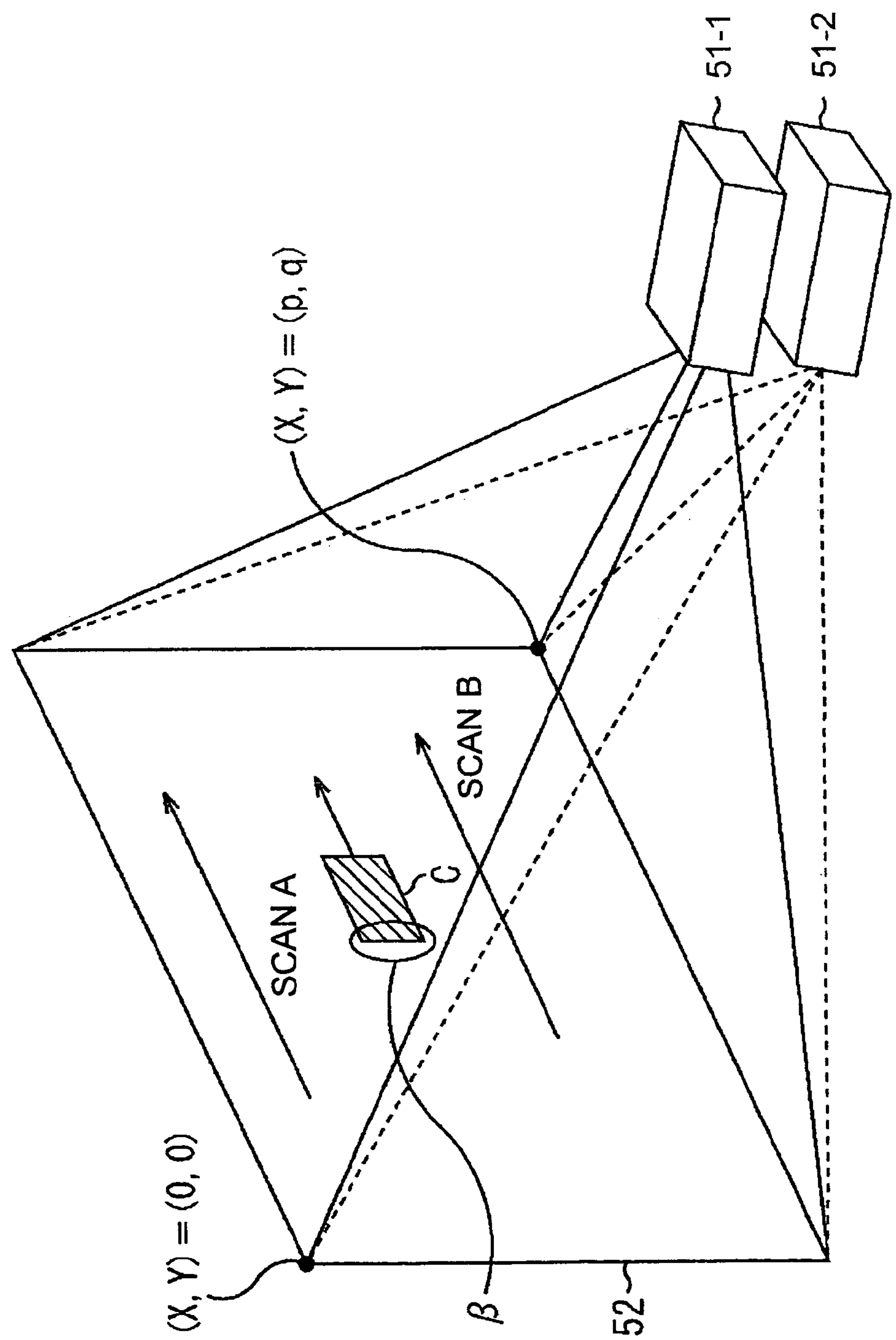
FIG. 3 is a diagram showing an example of a configuration of an image display apparatus shown in FIG. 1.

The image display apparatus 12 may be in the form of a single piece or may be in the form of an image display system including a plurality of devices. In the case in which the image display apparatus 12 is constructed in the form of an image display system, the image display system may include, for example, projectors 51-1 and 51-2 and a screen 52 as shown in FIG. 3.

A specific example of the operation of the image display apparatus 12 is described below for a case in which the image display apparatus 12 is realized using the projectors 51-1 and 51-2 and the screen 52 shown in FIG. 3. The projector 51-1 corresponds to the scan controller 41-1 in FIG. 1, the projector 51-2 corresponds to the scan controller 41-2 in FIG. 1, and the screen 52 corresponds to the display unit 43 in FIG. 1.

The analog signal, corresponding to the output video signal S2 output from the frame memory 23 at the timings described above with reference to FIG. 2 and converted into analog form by the digital-to-analog converter 25-1, is supplied to the projector 51-1. Similarly, the analog signal, corresponding to the output video signal S3 output from the frame memory 23 at the timings described above with reference to FIG. 2 and converted into analog form by the digital-to-analog converter, 25-2 is supplied to the projector 51-2.

Each of the projector 51-1 and the projector 51-2 displays a frame image corresponding to the supplied video signal by scanning the screen 52 in a horizontal direction across pixels, making up the image to be displayed, from a pixel (X Y)=(0, 0) to a pixel (X, Y)=(p, q) according to the timing scheme controlled by the display controller 27. The projector 51-1 and the projector 51-2 each display frame images on the screen 52 at a frame rate equal to m/2. The timing of starting scanning each frame by the respective projectors 51-1 to 51-2 is shifted between the two projectors by a phase of ½ of one frame of the motion image displayed by the respective projectors 51-1 and 51-2, i.e., by a time of 1/m, in a similar manner as described above with reference to the output video signals S2 and S3 shown in FIG. 2.

For example, when the projector 51-2 scans a line denoted by "SCAN B" on the screen 52 so as to draw a corresponding line of the frame $\alpha+1$, the projector 51-1 scans a line denoted by "SCAN A" on the screen 52 so as to draw a corresponding line of the frame $\alpha+2$. Herein, the line denoted by "SCAN B" is different in position by ½ of the number of lines constituting one frame from the line denoted by "SCAN A". That is, the motion image displayed on the screen 52 is periodically rewritten at time intervals of 1/m alternately by the scan A and the scan B.

For example, if the projector 51-1 and the projector 51-2 each display the image at a frame rate of 150 Hz, the effective frame rate of the motion image displayed on the screen becomes 300 Hz.

The pixel scanning positions can be adjusted such that no position error occurs between lines scanned by "A" and corresponding lines scanned by "B", by using an optical image position adjustment technique similar to that used in a twin stack technique. The twin stack technique refers to a technique that uses two projectors to display the same image at the same position on a screen at the same time thereby achieving a brighter displayed image. When an image is displayed using the twin stack technique, the displayed image has brightness two times higher than the brightness that can be achieved using a single projector, and thus this technique is useful to obtain a bright projected image even in a light environment or even when a projection length is long.

In the twin stack technique, to prevent a resultant combined image from being blurred by a pixel position error between two individual projected images, pixel positions of the images projected by two projectors are optically adjusted precisely using a picture shift capability, which is widely used in the twin stack technique.

A specific example of a technique of adjusting a pixel position error between two projected images may be found, for example, in Japanese Patent Application No. 10-058291.

In the image display device 12, if the position adjustment is made such that the position error between corresponding lines scanned by the scan A and the scan B becomes smaller than one pixel (or one dot), a sharp motion image can be obtained without being blurred by the registration error between two adjacent frames.

In this technique according to the present embodiment, the projector 51-1 and the projector 51-2 form images frame by frame such that scanning is started alternately by the projector 51-1 and the projector 51-2 and such that the scan start timing is shifted by an amount corresponding to ½ of one frame between the projector 51-1 and the projector 51-2. Thus, before scanning of one frame by one of the projectors is completed, scanning of a next frame is started by the other projector. Herein, in FIG. 3, if an object C displayed on the screen 52 moves from left to right in the displayed image, the smoothness of motion of the object C perceived by a user is determined by the smoothness of motion of an edge β.

Figure 4:
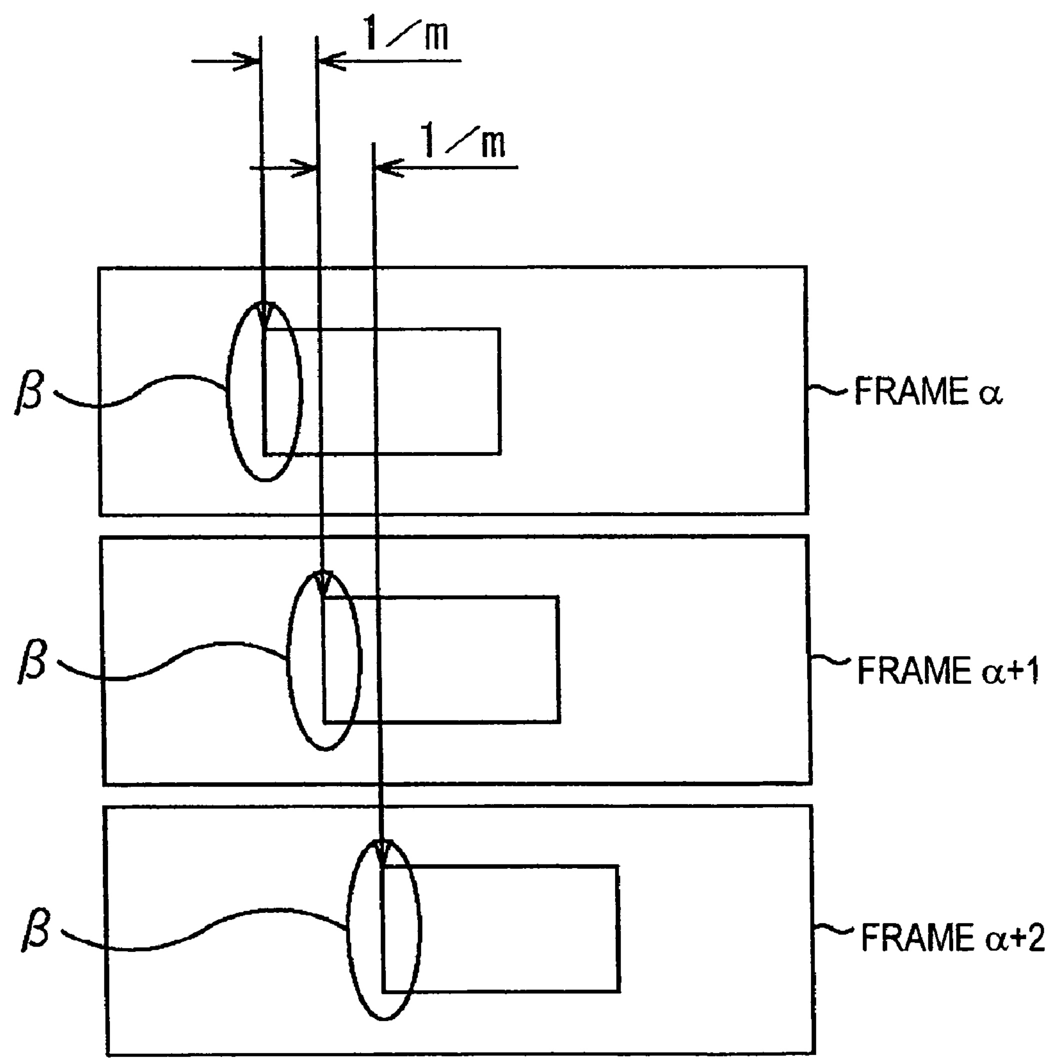
FIG. 4 is a diagram showing a manner in which an edge of a moving object in a motion image displayed by the image display apparatus shown in FIG. 3 is refreshed at a particular rate.

The manner in which the edge β of the object C is displayed on the screen 52 is described in further detail below with reference to FIG. 4.

First, an image of the object C is displayed in the frame α by the projector 51-1. Then, 1/m sec after, the object C is displayed in the frame α+1 by the projector 51-2. Thus, the edge β of the object C is rewritten 1/m after it was displayed in the frame α. After a further period of 1/m, the object C is displayed in the frame α+2 by the projector 51-1, and the edge β of the object C is again rewritten 1/m after it was displayed in the frame α+1.

For example, when the projector 51-1 and the projector 51-2 each display the image at a frame rate of 150 Hz, the frame image including the motion image displayed by a single projector (the projector 51-1 or the projector 51-2) is rewritten every 1/150 sec. However, in the motion image that is rewritten frame by frame alternately by the projector 51-1 and the projector 51-2, the edge β of the object C displayed on the screen 52 is refreshed every 1/300 sec, and thus the edge β of the object C is perceived by a user as moving very smoothly.

Although in the example described above, the image display apparatus 12 displays an image under the control of the display controller 27 disposed outside, the display controller 27 may be disposed in the inside of the image display apparatus 12 and the image display apparatus 12 may display an image in accordance with a control signal supplied from the controller 24. Alternatively, an internal controller other than the display controller 27 may be disposed in the image display apparatus 12, and the projector 51-1 and the projector 51-2 may be controlled by the internal controller in accordance with a vertical synchronization signal and a dot clock signal supplied from the display controller 27 such that the projector 51-1 and the projector 51-2 operate in a similar manner as described above with reference to FIG. 3.

Although in the example described above, the image display apparatus 12 is in the form of a projection display system including the projector 51-1, the projector 51-2, and the screen 52, any type of system of displaying an image in a dot-sequential or line-sequential manner may be used as the image display apparatus 12 as long as it is capable of displaying a sequence of frames using two display devices such that frames are alternately scanned by the two display devices and such that the scan start time is shifted by an amount corresponding to ½ of one frame thereby displaying a moving image at a frame rate twice the frame rate that can be achieved by using only a single display device.

Instead of projectors, direct-view-type displays capable of displaying an image in a dot-sequential or line-sequential manner may be used in the image display apparatus 12. Specific examples of such displays include a CRT (Cathode Ray Tube) display, an LCD (Liquid Crystal Display) display, a GLV (Grating Light Valve) display, an LED (Light Emitting Diode) display, and a FED (Field Emission Display) display.

The GLV display is a projection display device using a micro ribbon array capable of controlling the direction and the color of light by means of diffraction of light. The micro ribbon array is made up of micro diffraction elements arranged in a line, and the GLV display forms a projected image by reflecting light by the micro ribbon array. The ribbons can be independently driven by an electrical signal to control the amount of diffraction by the respective ribbons thereby creating bright or dark points in an image. This makes it possible to achieve a smooth gradation representation and high contrast.

The LED is a device having a junction of a two different types of semiconductors, and emits light when a current is passed across the junction.

The FED is a device capable of emitting light by colliding electrons emitted from a cathode against a fluorescent material coated on an anode thereby forming an image in a similar manner as with a CRT. Note that, unlike the CRT using a cathode serving as a point electron source, the cathode of the FED is in the form of a plane-shaped electron source.

Figure 5:
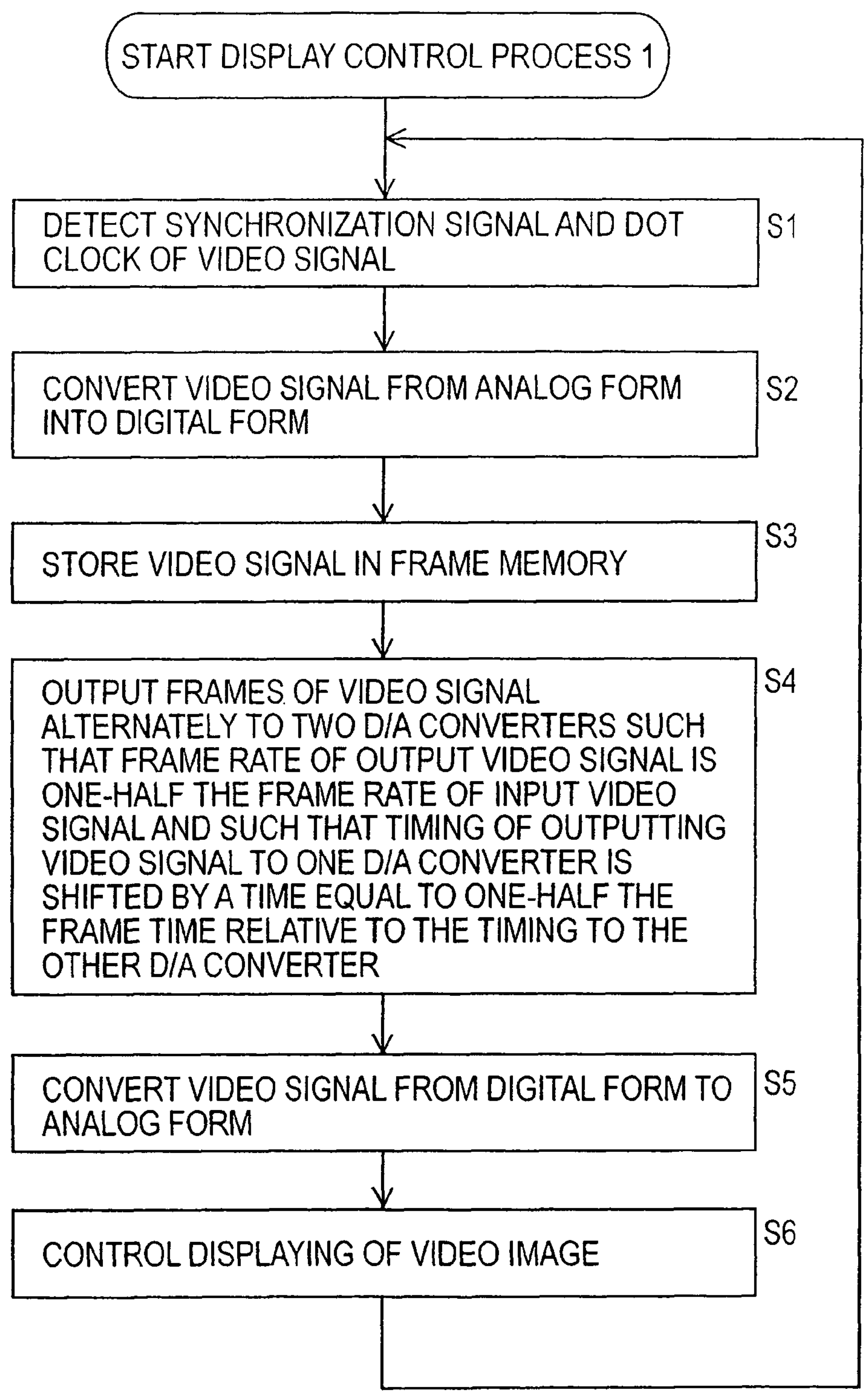
FIG. 5 is a flow chart showing an example of a display control process performed by the image display system shown in FIG. 1.

Now, referring to a flow chart shown in FIG. 5, an example of a display control process performed by the image display system 1 shown in FIG. 1 is described.

In step S1, the synchronization signal detector 22 detects a synchronization signal and a dot clock from a supplied image signal and supplies the detected vertical synchronization signal and the dot clock signal to the controller 24.

In step S2, the analog-to-digital converter 21 converts a supplied analog video signal into a digital form and supplies the resultant digital video signal to the frame memory 23.

In step S3, the frame memory 23 stores the received digital video signal.

In step S4, under the control of the controller 24, the frame memory 23 outputs the video signal frame by frame alternately to the two digital-to-analog converters 25-1 and 25-2 such that the video signal is output to the respective digital-to-analog converters 25-1 and 25-2 at a frame rate corresponding to a dot clock equal to ½ of that of the input video signal S1 and such that the output timing is shifted by a time corresponding to ½ of one frame between the two digital-to-analog converters 25-1 and 25-2, as described above with reference to FIG. 2. More specifically, an output video signal S2 is supplied to the digital-to-analog converter 25-1, and an output video signal S3 is supplied to the digital-to-analog converter 25-2.

In this step, the controller 24 controls the frame memory 23 such that frames stored in the frame memory 23 are separated into odd frames and even frames and alternately output to the digital-to-analog converter 25-1 and the digital-to-analog converter 25-2 such that the output timing is shifted between odd and even frames by a time equal to ½ of a period during which one full frame is scanned.

In step S5, the D/A converter 25-1 the D/A converter 25-2 each convert the supplied video signals into analog video signals and supply the resultant analog video signals to the image display apparatus 12.

In step S6, the display controller 27 controls the scan controller 41-1 and the scan controller 41-2 (the projectors 51-1 and 51-2 in the example shown in FIG. 3) of the image display apparatus 12 such that scanning of a frame is started alternately by the scan controller 41-1 and the scan controller 41-2 at intervals equal to ½ of a period needed to scan one full frame in a similar manner as described above with reference to the output video signals S2 and S3 shown in FIG. 2, thereby displaying an image on the display unit 43 (the screen 52 in the example shown in FIG. 3) of the image display apparatus 12 at an effective frame rate that is two times greater than the frame rate of each of the scan controller 41-1 and the scan controller 41-2.

As described above, the video signal of the motion image to be displayed is divided into odd and even frames and supplied to the respective display devices, and the odd and even frames are scanned by the respective two display devices at a frame rate equal to ½ of the frame rate at which the motion image is displayed, such that scanning is started alternately by the respective two display devices at intervals equal to ½ of one frame period, thereby displaying the motion image at the frame rate two times greater than the frame rate that can be achieved by each display device.

By adjusting the scanning position accuracy of the two corresponding scanning lines such that the position error becomes less than one dot (one pixel), a sharp motion image can be obtained without being blurred by the registration error between two adjacent frames.

Figure 6:
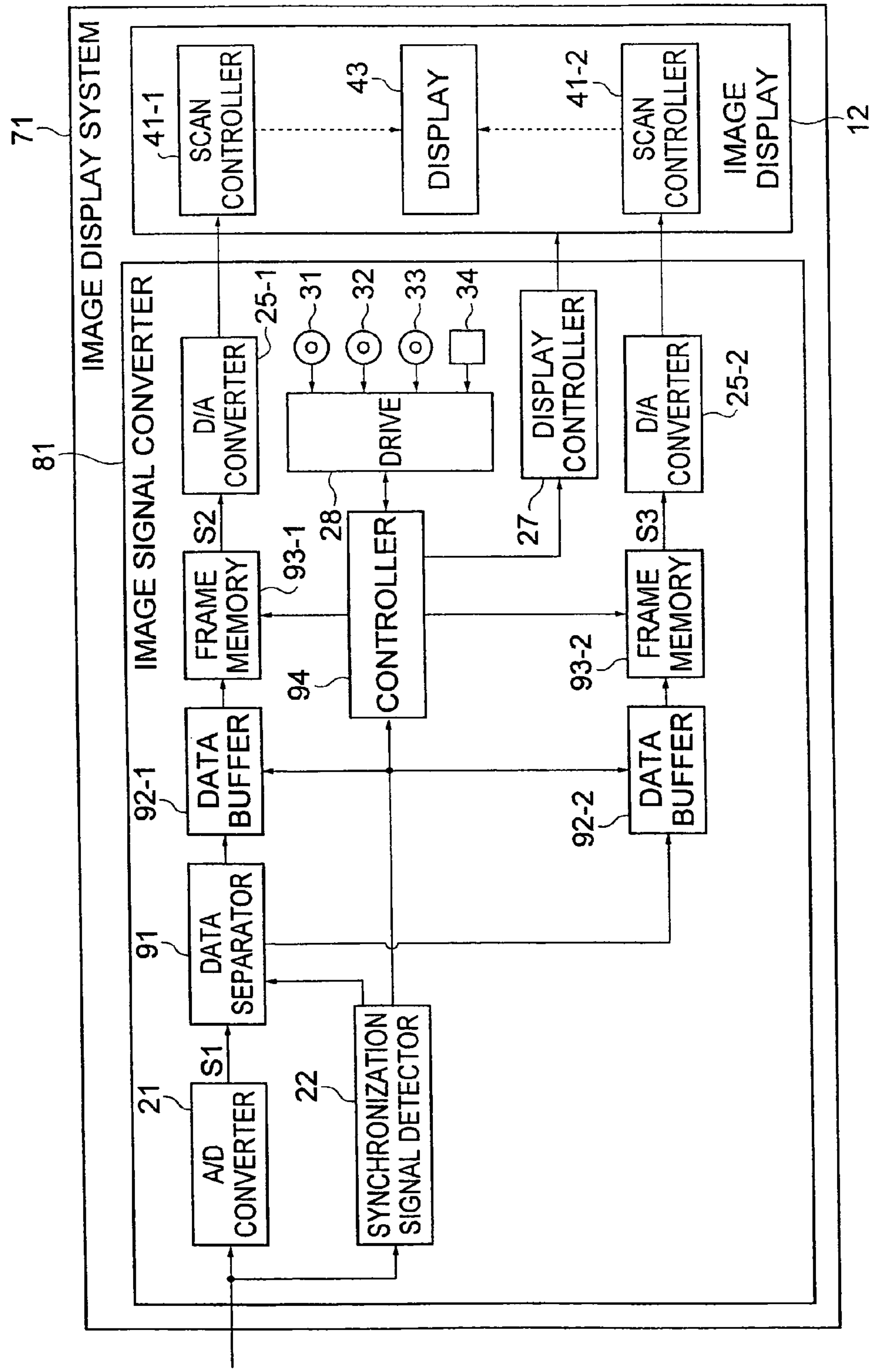
FIG. 6 is a block diagram showing another example of a configuration of an image display system according to the present invention.

FIG. 6 is a block diagram showing an image display system 71, configured in a different manner from that of the image display system 1 shown in FIG. 1, according to the present invention.

Similar parts to those in FIG. 1 are denoted by similar reference numerals and they are not described herein unless a further description is needed.

The image display system 71 shown in FIG. 6 displays a motion image using an image display apparatus 12 similar to that used in the image display system 1 shown in FIG. 1, but the image signal conversion is performed by an image signal converter 81 that is different from the image signal converter 11 shown in FIG. 1.

An analog image signal input to the image signal converter 81 is supplied to an analog-to-digital converter 21 and a synchronization signal detector 22.

The analog-to-digital converter 21 converts the analog image signal with a frame rate m into a digital image signal and supplies the resultant digital image signal to a data separator 91. The synchronization signal detector 22 detects a frame rate and a dot clock of the image signal from the image signal and generates a vertical synchronization signal and a dot clock signal. The generated vertical synchronization signal and dot clock signal are supplied to the data separator 91, a data buffer 92-1, a data buffer 92-2, and a controller 94.

On the basis of the vertical synchronization signal supplied from the synchronization signal detector 22, the data separator 91 separates the digital image signal into frames and supplies the frames alternately to the data buffer 92-1 and the data buffer 92-2. For example, the data separator 91 supplies odd frames to the data buffer 92-1 and even frames to the data buffer 92-2.

The data buffer 92-1 serves as an interface between the data separator 91 and a frame memory 93-1, and the data buffer 92-2 serves as an interface between the data separator 91 and a frame memory 93-2. More specifically, the data buffers 92-1 and 92-1 supplies the image signal received from the data separator 91 to the frame memory 93-1 or 93-2 on a frame-by-frame basis in accordance with the vertical synchronization signal supplied from the synchronization signal detector 22.

In accordance with the vertical synchronization signal and the dot clock signal received from the synchronization signal detector 22, the controller 94 controls the timing of outputting the video signal from the frame memory 93-1 and the frame memory 93-2.

Under the control of the controller 94, the frame memory 93-1 supplies the video signal to the digital-to-analog converter 25-1. Similarly, under the control of the controller 94, the frame memory 93-2 supplies the video signal to the digital-to-analog converter 25-2.

If the signal supplied to the data separator 91 is denoted as an input video signal S1, the signal output from the frame memory 93-1 as an output video signal S2, and the signal output from the frame memory 93-2 as an output video signal S3, then those signals have a similar relationship to that among the signals described above with reference to FIG. 2.

In the system described above with reference to FIG. 2, signal delays are not taken into account in FIG. 2, although signal delay can occur during data processing such as the data separation process performed by the data separator 91. The controller 94 may compensate for the signal delays or the timing error between the two video signal paths by adjusting the timing of outputting the signals from the data buffer 92-1 and the data buffer 92-2.

The digital-to-analog converter 25-1 converts supplies the received digital image signal into an analog image signal and supplies the resultant analog image signal to the image display device 12. The digital-to-analog converter 25-2 converts supplies the received digital image signal into an analog image signal and supplies the resultant analog image signal to the image display device 12.

On the basis of information supplied from the controller 94, the display controller 27 controls the image display device 12 to display a motion image in a similar manner as with the output video signals S2 and S3 described above with reference to FIG. 2.

As required, a drive 28 is connected with the controller 94. On the drive 28, a magnetic disk 31, an optical disk 32, a magneto-optical disk 33, or a semiconductor memory 34 is mounted so that the controller 24 can read or store information from or in the storage medium mounted on the drive 28.

Figure 7:
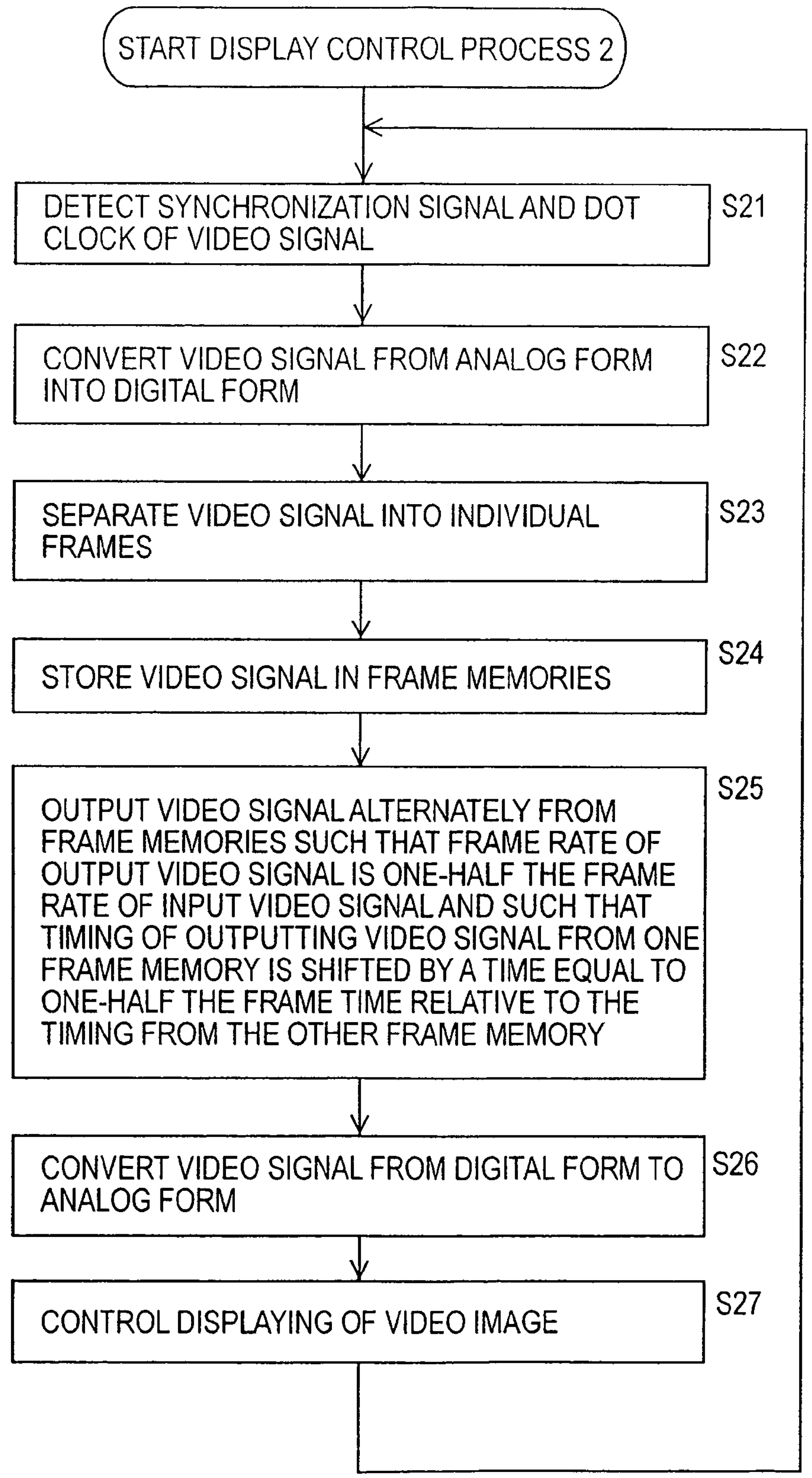
FIG. 7 is a flow chart showing another example of a display control process performed by the image display system shown in FIG. 6.

Now, referring to a flow chart shown in FIG. 7, an example of a display control process performed by the image display system 71 shown in FIG. 6 is described.

In step S21, the synchronization signal detector 22 detects a synchronization signal and a dot clock from a supplied image signal and supplies a vertical synchronization signal and a dot clock signal to the data separator 91, the data buffer 92-1, the data buffer 92-2, and the controller 94.

In step S22, the analog-to-digital converter 21 converts a supplied analog video signal into a digital form and supplies the resultant digital video signal to the data separator 91.

In step S23, on the basis of the vertical synchronization signal supplied from the synchronization signal detector 22, the data separator 91 separates the analog video signal into frames and supplies the frames alternately to the data buffer 92-1 and the data buffer 92-2. For example, the data separator 91 supplies odd frames to the data buffer 92-1 and even frames to the data buffer 92-2.

In step S24, the data buffer 92-1 supplies the received video signal to the frame memory 93-1, and the data buffer 92-2 supplies the received video signal to the frame memory 93-2.

In step S25, the controller 94 controls the frame memory 93-1 and the frame memory 93-2 such that the video signal is output frame by frame alternately from the frame memory 93-1 to the digital-to-analog converter 25-1 and from the frame memory 93-2 to the digital-to-analog converter 25-2 at a frame rate corresponding to a dot clock equal to ½ of that of the input video signal S1 and such that the outputting timing is shifted by a time corresponding to ½ of one frame period between the two digital-to-analog converters 25-1 and 25-2. That is, if the signal supplied to the data separator 91 is denoted as an input video signal S1, the signal output from the frame memory 93-1 as an output video signal S2, and the signal output from the frame memory 93-2 as an output video signal S3, then the inputting and outputting of those signals are controlled by the controller 94 in a similar manner to that described above with reference to FIG. 2.

In step S26, the D/A converter 25-1 the D/A converter 25-2 each convert the supplied video signals into analog video signals and supply the resultant analog video signals to the image display apparatus 12.

In step S27, the display controller 27 controls the scan controller 41-1 and the scan controller 41-2 (the projectors 51-1 and 51-2 in the example shown in FIG. 3) of the image display apparatus 12 such that scanning of a frame is started alternately by the scan controller 41-1 and the scan controller 41-2 at intervals equal to ½ of a period needed to scan one full frame in a similar manner as described above with reference to the output video signals S2 and S3 shown in FIG. 2, thereby displaying an image on the display unit 43 (the screen 52 in the example shown in FIG. 3) of the image display apparatus 12 at an effective frame rate that is two times greater than the frame rate of each of the scan controller 41-1 and the scan controller 41-2. Thus, the process is completed.

Also in the image display system 71 shown in FIG. 6, as described above, as in the image display system shown in FIG. 1, the video signal of the motion image to be displayed is divided into odd and even frames and supplied to the respective two display devices, i.e., the scan controller 41-1 and the scan controller 41-2, which in turn scan frame images at a frame rate equal to ½ of the one frame period such that the scan start timing is shifted by an amount corresponding to ½ of one frame period, thereby allowing the motion image to be displayed at an effective frame rate that is two times greater than the frame rate of the display devices.

Although in the embodiment described above, the given image signal is divided into two sub image signals and an image is displayed using two scan controllers according to the respective sub image signals, the number of sub image signals is not limited to two, but the given image signal may be divided into an arbitrary number of sub image signals.

Figure 8:
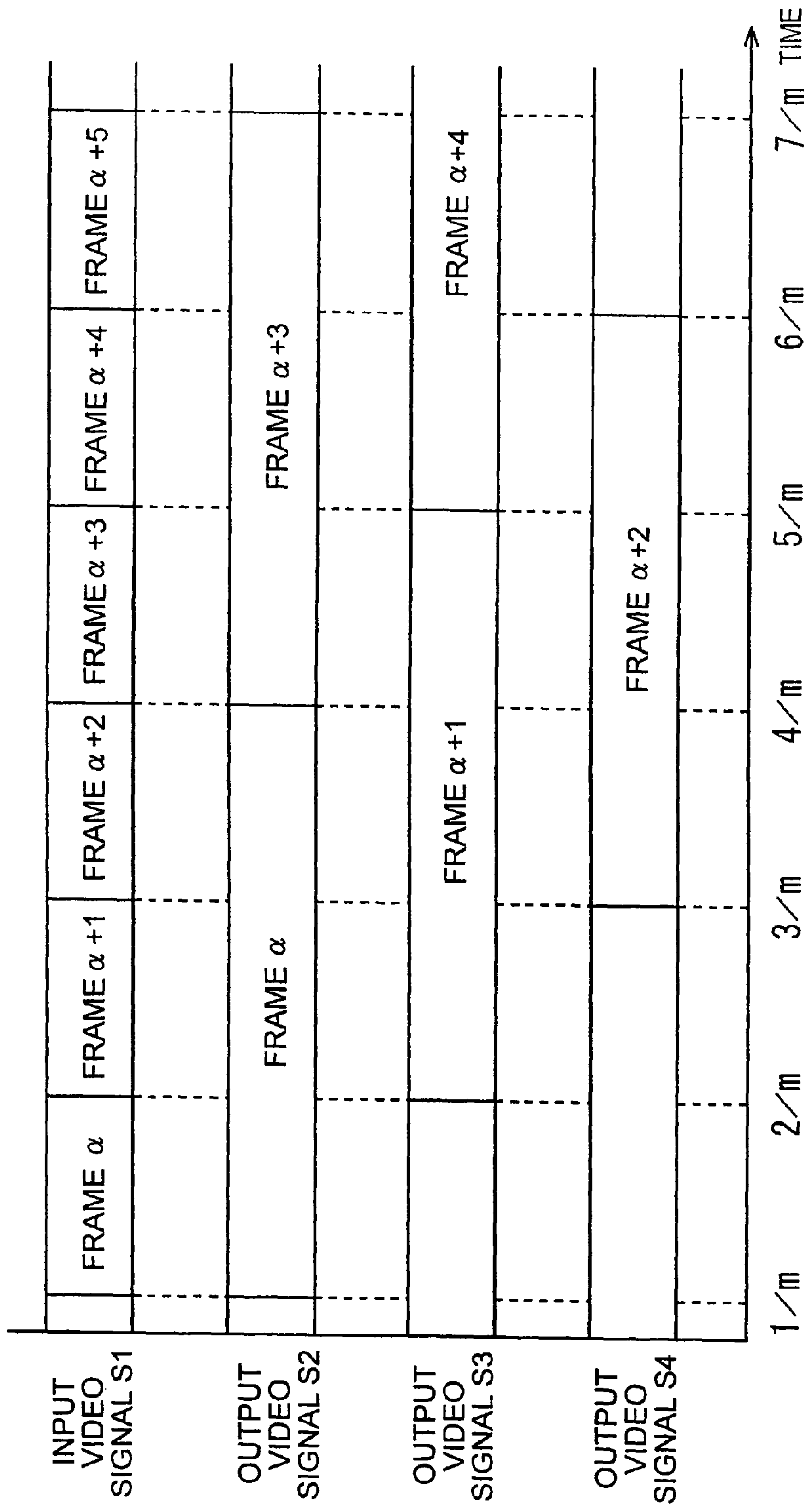
FIG. 8 is a diagram showing timings of an input video signal and output video signals.

In a case in which the given image signal is divided, for example, into three sub image signals, the image signal output from the frame memory is supplied in turn to three digital-to-analog converters or the image signal is separated by the data separator into three sub image signals and supplied in turn to three frame memories. Thus, as shown in FIG. 8, the input video signal S1 is divided into three output video signals S2, S3, and S4 and supplied to respective three scan controllers.

The first scan controller controls displaying of frames $\alpha$, $\alpha+3$, $\alpha+6$, . . . , of the output video signal S2, the second scan controller controls displaying of frames $\alpha+1$, $\alpha+4$, $\alpha+7$, . . . , of the output video signal S3, and the third scan controller controls displaying of frames $\alpha+2$, $\alpha+5$, $\alpha+8$, . . . , of the output video signal S4. The frame rates of those frames displayed by the first scan controller, the second scan controller, and the third scan controller are equal to ⅓ of the frame rate of the input video signal, the timing of starting the scanning of the frames by the first scan controller, the second scan controller, and the third scan controller are shifted from each other by a time equal to ⅓ of the period needed to scan one frame of output video signals S2 to S4.

In a case in which the frame rate of the input video signal S1 is, for example, 180 Hz, the input video signal S1 is divided into three output video signals S2, S3, and S4 and each of the three output video signals S2, S3, and S4 are scanned by the respective three scan controllers at a frame rate of 60 Hz. In a case in which the frame rate of the input video signal S1 is, for example, 150 Hz, the input video signal S1 is divided into three output video signals S2, S3, and S4 and each of the three output video signals S2, S3, and S4 are scanned by the respective three scan controllers at a frame rate of 50 Hz. Thus, it is possible to display a motion image at a high frame rate by using scan controllers having the capability of displaying images at a low frame rate such as 50 Hz (used in the PAL (Phase Alternating Line) standard) or 60 Hz (used in the NTSC (National Television System Committee) standard or the HD (High Definition) standard).

In a case in which the input video signal is divided into n sub video signals, n scan controllers are used, and n output video signals are displayed by the respective scan controllers, from the first scan controller to the nth scan controller, at a frame rate equal to 1/n of the frame rate of the input video signal. In this operation of displaying the n output video signals, the timings of starting scanning by the respective scan controllers, from the first scan controller to the nth scan controller, are shifted from one scan controller to another by a time equal to 1/n of one frame period of each output video signal thereby displaying a motion image at an effective frame rate n times the frame rate that can be achieved by a single scan controller.

When there area provided s scan controllers, an input video signal may be divided into as many sub video signals as $n<s$, and a motion image may be displayed using n scan controllers of the s scan controllers.

In the examples shown in FIG. 1 and FIG. 6, an image display system is realized using an image signal converter and an image display apparatus disposed separately. Alternatively, those components may be integrated into one piece.

In the image signal converter 11 shown in FIG. 1, the frame memory 23 is controlled by the controller 24 and the image display apparatus 12 is controlled by the display controller 27. In the case of the image signal converter 81 shown in FIG. 6, the frame memory 93-1 and the frame memory 93-2 are controlled by the controller 94, and the image display apparatus 12 is controlled by the display controller 27. Alternatively, the frame memory for storing a video signal and the image display apparatus for displaying an image may be controlled by the same controller. The display controller 27 may be disposed not in the image signal converter 11 or 81 but in the image display apparatus 12.

In motion images, degradation can occur which is peculiar to motion images and which does not occur in still images. In displays according to the PAL standard (50 Hz), the NTSC standard (60 Hz), or the HD standard (60 Hz), which are most widely used, a change in an image with time cannot be perfectly reproduced, and the imperfectness of reproduction of the change with time in a particular condition causes an imperfect spatial reproduction of the image. Degradation depends, for example, on the shutter speed used to acquire motion image data, the light emission time during which to emit light in the displaying of the motion image, and the condition associated with the line of sight.

Figure 9:
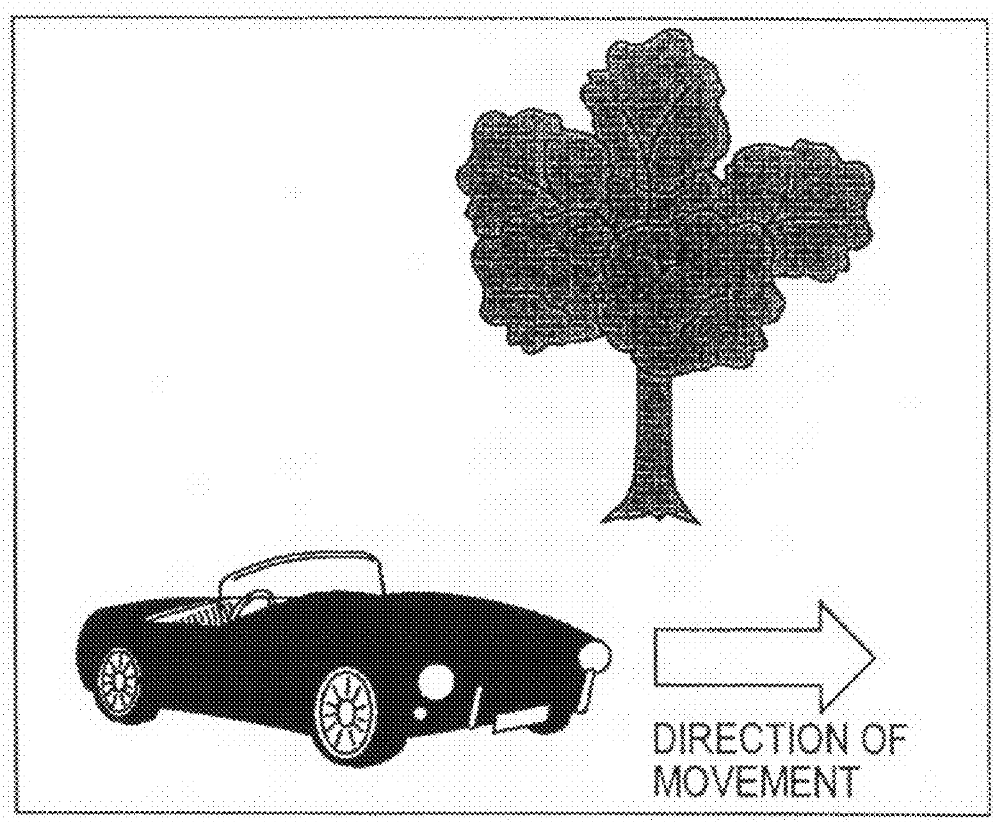
FIG. 9 is a diagram showing an example of a scene including both a moving object and an object at rest.

FIG. 9 shows an example of a scene including both an object at rest and a moving object, which can often occur in a real world. In this specific example, the scene includes a car moving from left to right and a tree fixed to the ground. When this scene shown in FIG. 9 is viewed by an observer, the scene looks like as shown in FIG. 10 or FIG. 11.

Figure 10:
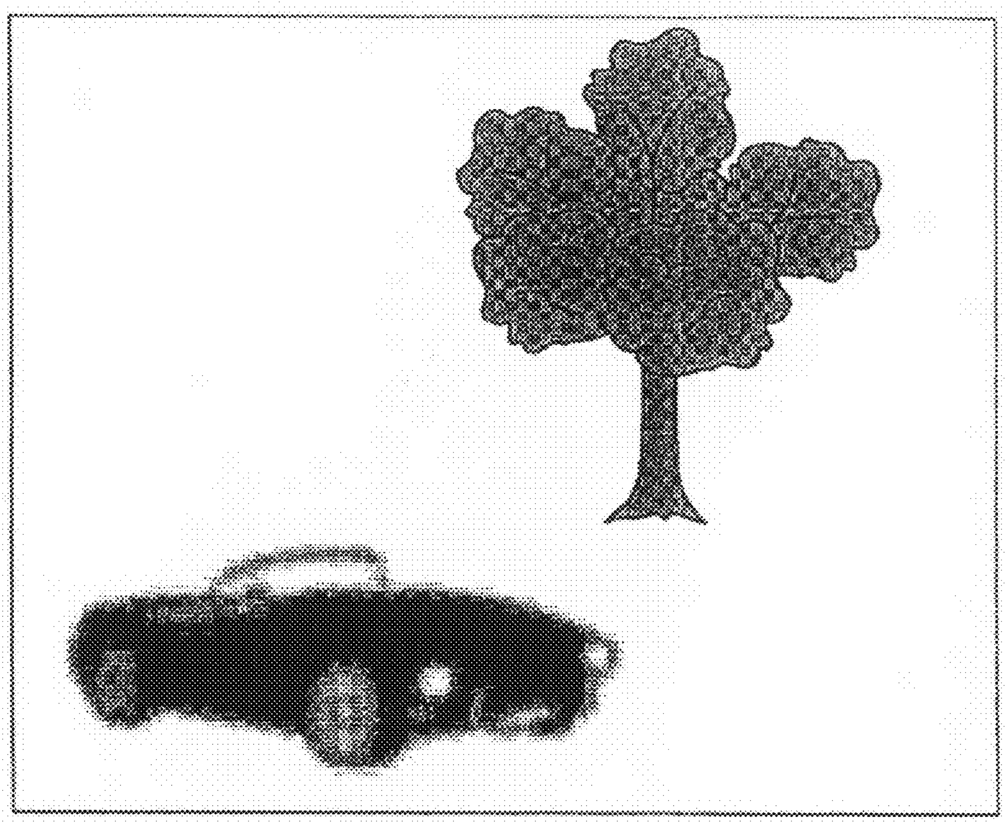
FIG. 10 is a diagram showing an example of a manner in which a scene is seen when the line of sight is fixed at an object at rest.
Figure 11:
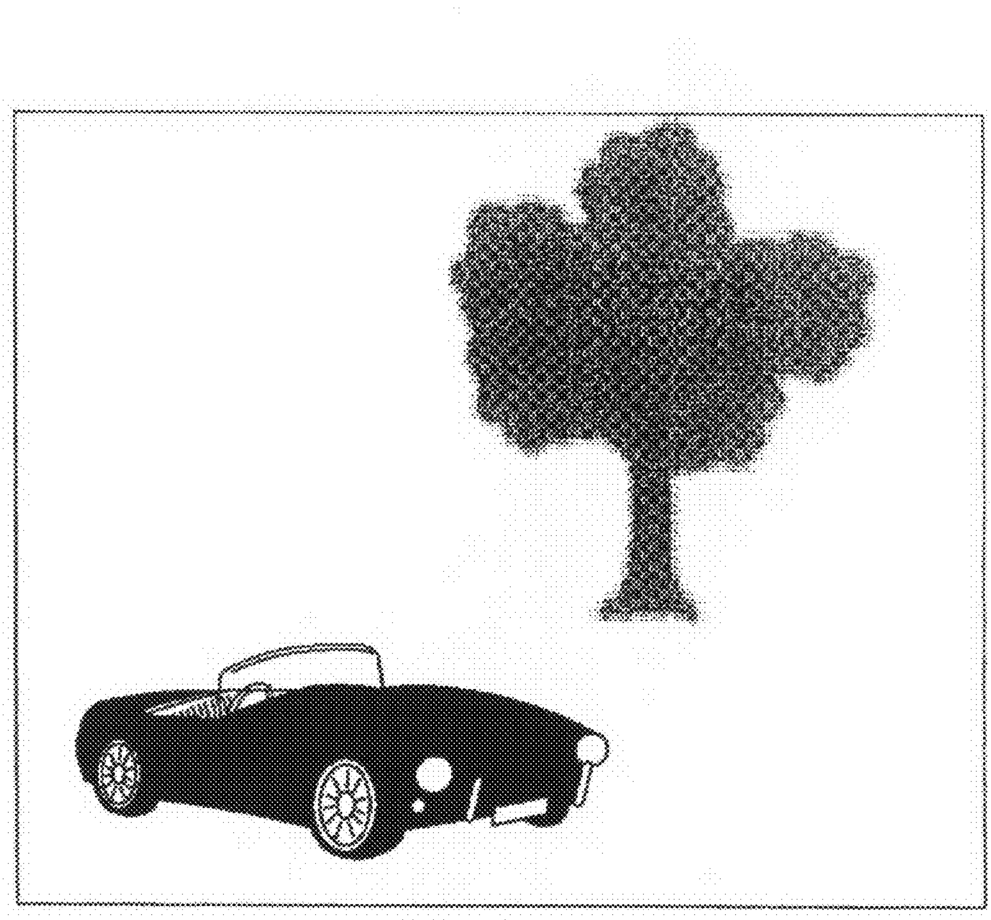
FIG. 11 is a diagram showing an example of a manner in which a scene is seen when the line of sight is varied according with motion of a moving object.

FIG. 10 shows a manner in which the scene is seen by the observer whose line of sight is fixed at the tree. In this case, the car moving from left to right is seen by the observer as being blurred. FIG. 11 shows a manner in which the scene is viewed by the observer whose line of sight varies according to the motion of the car. In this case, the tree at rest is seen by the observer as being blurred.

Hereinafter, the condition in which the line of sight is fixed at an object at rest in an observation coordinate system will be referred to as a fixed line-of-sight condition, and the condition in which the line of sight varies according to an object moving in the observation coordinate system will be referred to as a varying line-of-sight condition. The example shown in FIG. 10 is in the fixed line-of-sight condition, and the example shown in FIG. 11 is in the varying line-of-sight condition. In either the fixed line-of-sight condition or the varying line-ofsight condition, an object at which the line of sight is directed is seen as clear. On the other hand, an object varying in relative position with respect to an object at which the line of sight is directed is seen as blurred.

This is because human eyes have the property of sensing a sight by integrating light incident on a retina over a particular period of time. For an image of an object moving in a retina coordinate system of an eye, a change in its position is integrated with respect to time, and thus the image becomes blurred. The degree of blurring increases in proportion to the moving speed in the retina coordinate system. Note that the moving speed in the retina coordinate system does not correspond to the actual moving speed of an object but corresponds to an angular speed (deg/sec).

As described above, an object at rest in the retina coordinate system is perceived as clear, and an object moving in the retina coordinate system is perceived as blurred. To realize a realistic high-quality image moving smoothly, it is important to reproduce an image in a similar manner to the manner in which an actual object is seen.

Figure 12:
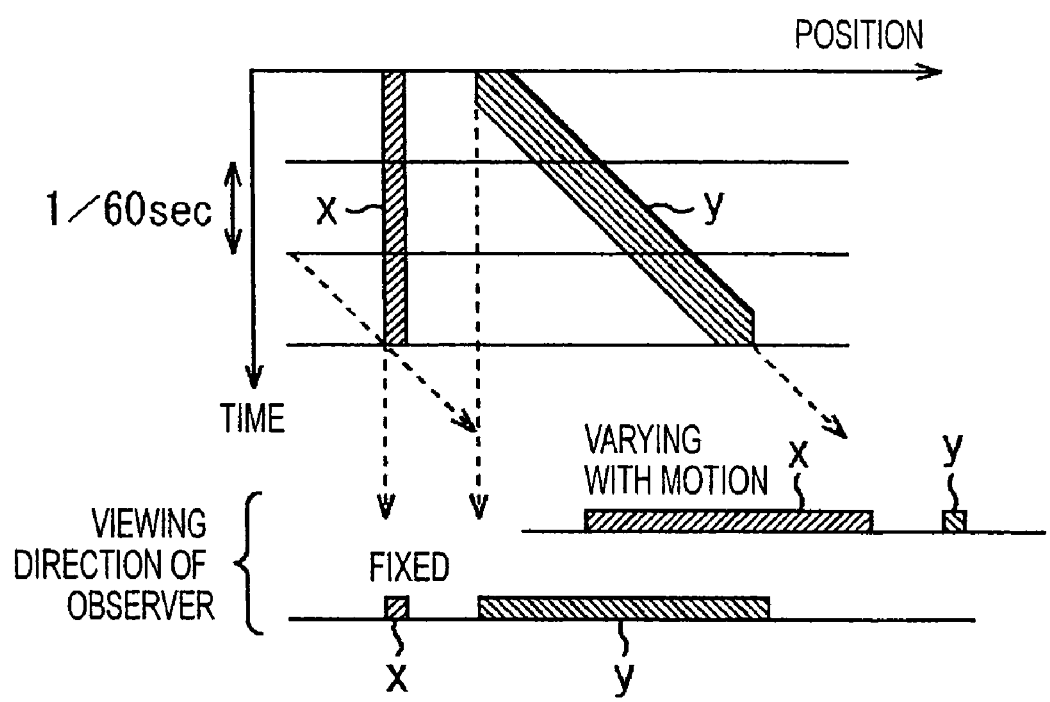
FIG. 12 is a diagram showing the manner in which objects are seen by an observer for a case in which the line of sight is fixed at an object at rest and also for a case in which the line of sight is varied according to motion of a moving object.

Referring to FIG. 12, the difference in the manner in which an object is seen by an observer described above with reference to FIGS. 10 and 11 is described in further detail below. On the upper side of FIG. 12, actual motion of an object moving in the actual world is shown. In FIG. 12, the vertical axis represents time and the horizontal axis represents a horizontal position. In this example, the position of a dot (corresponding to the tree shown in FIGS. 9 to 11, and denoted by x in FIG. 12) fixed in the actual world, and the position of a dot (corresponding to the car shown in FIGS. 9 to 11, and denoted by y in FIG. 12) varying at a constant speed are plotted as a function of time. On the lower side of FIG. 12, the manner in which the dots fixed or moving in the actual world are seen by an observer is shown for the case in which the line of sight is fixed and for the case in which the line of sight is varied according to the moving dot. Arrows represented by broken lines indicate motion of the point viewed by an observer, i.e., the direction in which an image is integrated on the retina. Arrows pointing downward indicate the direction in which integration is performed in the fixed line-of-sight condition, and oblique allows indicate the direction in which integration is performed in the varying line-of-sight condition. As can be seen, when an observer views a moving object while varying the line of sight according to the motion of the object, the moving dot (car) is seen as clear but the dot at rest (tree) is seen as blurred. On the other hand, when the line of sight of the observer is fixed at the object at rest, the dot at rest (tree) is seen as clear but the moving dot (car) is seen as blurred.

Referring to FIGS. 13A to 13D, the manner in which the image of the scene shown in FIG. 9 is taken in the fixed line-of-sight condition is seen by an observer when the image is played back as a motion image, for various conditions in terms of the image taking conditions, displaying conditions, and observing conditions. On the upper side of each of FIGS. 13A to 13D, a change of the image with time is shown. On the lower side of each of FIGS. 13A to 13D, the integral of light intensity of each motion image taken in the same direction as the direction in which the line of sight moves in the fixed line-of-sight mode and the in the varying line-of-sight mode is shown as a view seen by an observer.

Figures 13A, 13B, 13C, 13D:
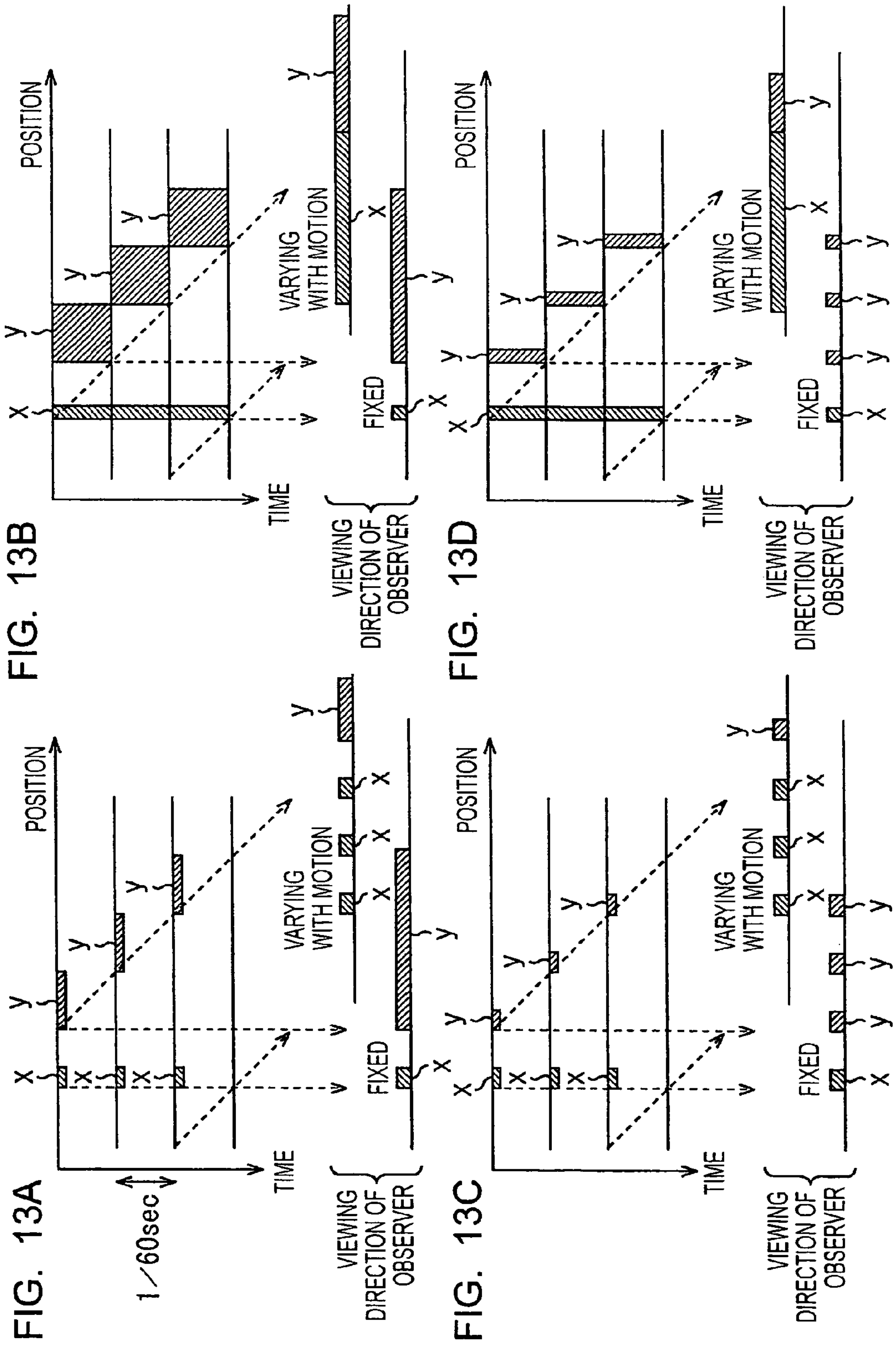
FIGS. 13A to 13D are diagrams showing the manner in which images of objects displayed on a screen are seen by an observer, for various conditions in terms of the image taking conditions, displaying conditions, and observing conditions.

FIG. 13A shows a manner in which the image is seen by the observer for a case in which the image is taken under an open shutter condition and the image is displayed under a pulse display condition. FIG. 13B shows a manner in which the image is seen by the observer for a case in which the image is taken under an open shutter condition and the image is displayed under a hold display condition. FIG. 13C shows a manner in which the image is seen by the observer for a case in which the image is taken under a high-speed shutter condition and the image is displayed under a pulse display condition. FIG. 13D shows a manner in which the image is seen by the observer for a case in which the image is taken under a high-speed shutter condition and the image is displayed under a hold display condition.

As can be seen from FIGS. 13A to 13D, degradation in image quality of the motion image varies depending on the conditions described above. For example, in contrast to the manner shown in FIG. 13A or 13C in which the moving object taken in the varying line-of-sight condition is displayed clearly, the moving object taken in the varying line-of-sight condition is displayed in a blurred manner in FIG. 13B or 13D because of the hold display condition used in displaying the motion image. This blurring is known as "motion blurring". Because "motion blurring" occurs for an object an observer is looking at, the blurring is easily perceived by the observer.

Figure 14:
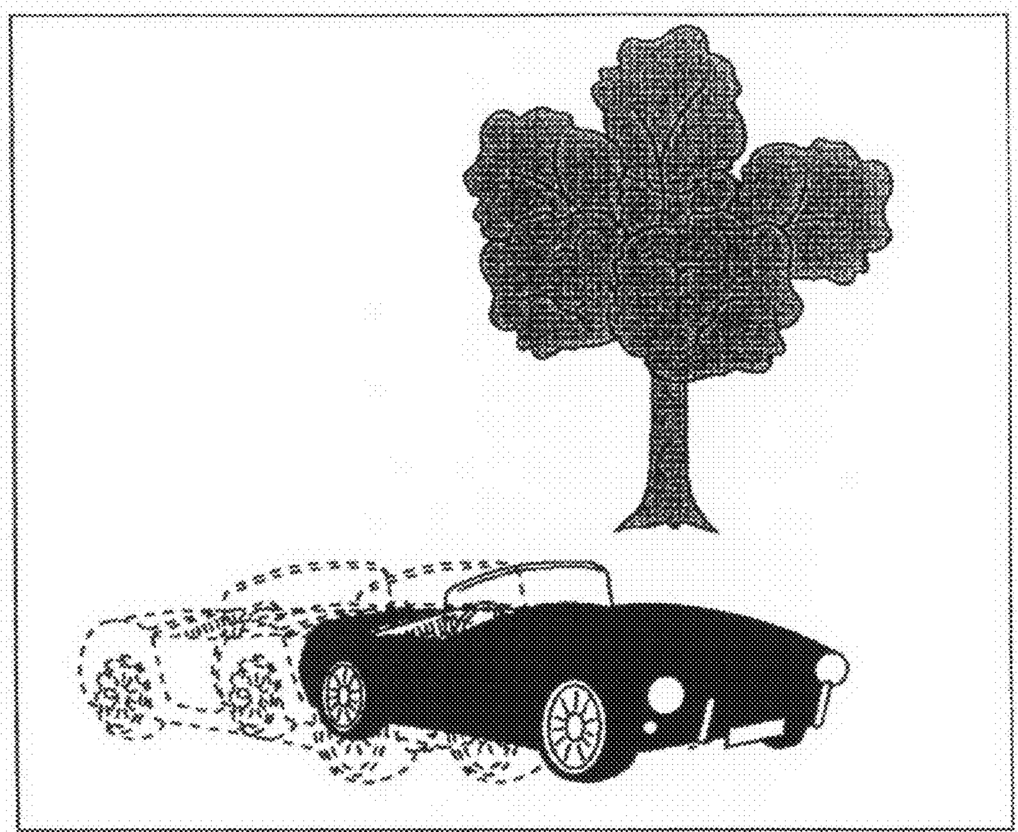
FIG. 14 is a diagram showing stroboscopic interference.

In FIG. 13D, in addition to degradation described above, degradation due to stroboscopic interference occurs in the fixed line-of-sight condition. In FIGS. 13A and 13C, degradation due to stroboscopic interference occurs in the varying line-of-sight condition. The stroboscopic interference refers to degradation in motion image quality that causes a moving object (such as a moving car) to be seen as a multiple image or as moving not smoothly but discontinuously as shown in FIG. 14 when the line of sight is fixed at an object (for example, a tree) at rest on the display. Because degradation due to stroboscopic interference occurs for a moving object when the line of sight is fixed at an object at rest or occurs for an object at a rest when the line of sight is varied according to motion of a moving object, that is, degradation occurs for an object which is not of interest for the observer, the degradation is not very noticeable compared with "motion blurring". However, in a case in which the line of sight is not varied perfectly according to motion of a moving object, the relationship between the object of interest and the line of sight becomes similar to that between a moving object and the line of sight in the fixed line-of-sight condition or to that between an object at rest and the line of sight in the varying line-of-sight condition. In this case, stroboscopic interference occurs for an object of interest for an observer, and thus degradation is very noticeable. In particular, degradation is very noticeable in a scene including a quickly moving object whose next motion cannot be easily predicted, as is the case in broadcast programs of sports or action movies. When a motion image such as a movie is taken, to prevent such degradation in motion image quality, a moving object is taken while moving the line of sight of a camera according to the motion of the moving object, such that the moving object is displayed at a fixed location when the image is displayed on a screen. It is also known to intentionally introduce motion blurring to suppress stroboscopic interference. However, such techniques cause a reduction in freedom of representation. Besides, the techniques described above cannot be used for sport scenes in which motion of an object of interest cannot be predicted.

The degradation in motion image quality increases with angular velocity of a moving object. Therefore, when the same scene is displayed on different displays, greater degradation in motion image quality occurs in a display having a greater viewing angle. The degradation in motion image quality of the above-described type cannot be improved by increasing resolution. On the contrary, the increase in resolution results in an increase in image quality for objects at rest, and thus degradation for moving objects becomes more noticeable. When the screen size of displays becomes greater and the resolution becomes higher in the future, the degradation in motion image quality will become very serious.

The degradation in motion image quality originates from poor capability of reproducing a change in image with time. Therefore, the essential solution for the above problem is to improve the capability of reproducing a change in image with time. The improvement in capability of reproducing a change in image with time can be achieved by increasing the frame rate at which an image is taken and the frame rate at which the image is displayed.

FIGS. 15A to 15D show improvements in degradation in motion image quality, achieved by taking motion images shown in FIGS. 13A to 13D at a frame rate twice that used in FIGS. 13A to 13D and displaying the image at a doubled frame rate.

Figures 15A, 15B, 15C, 15D:
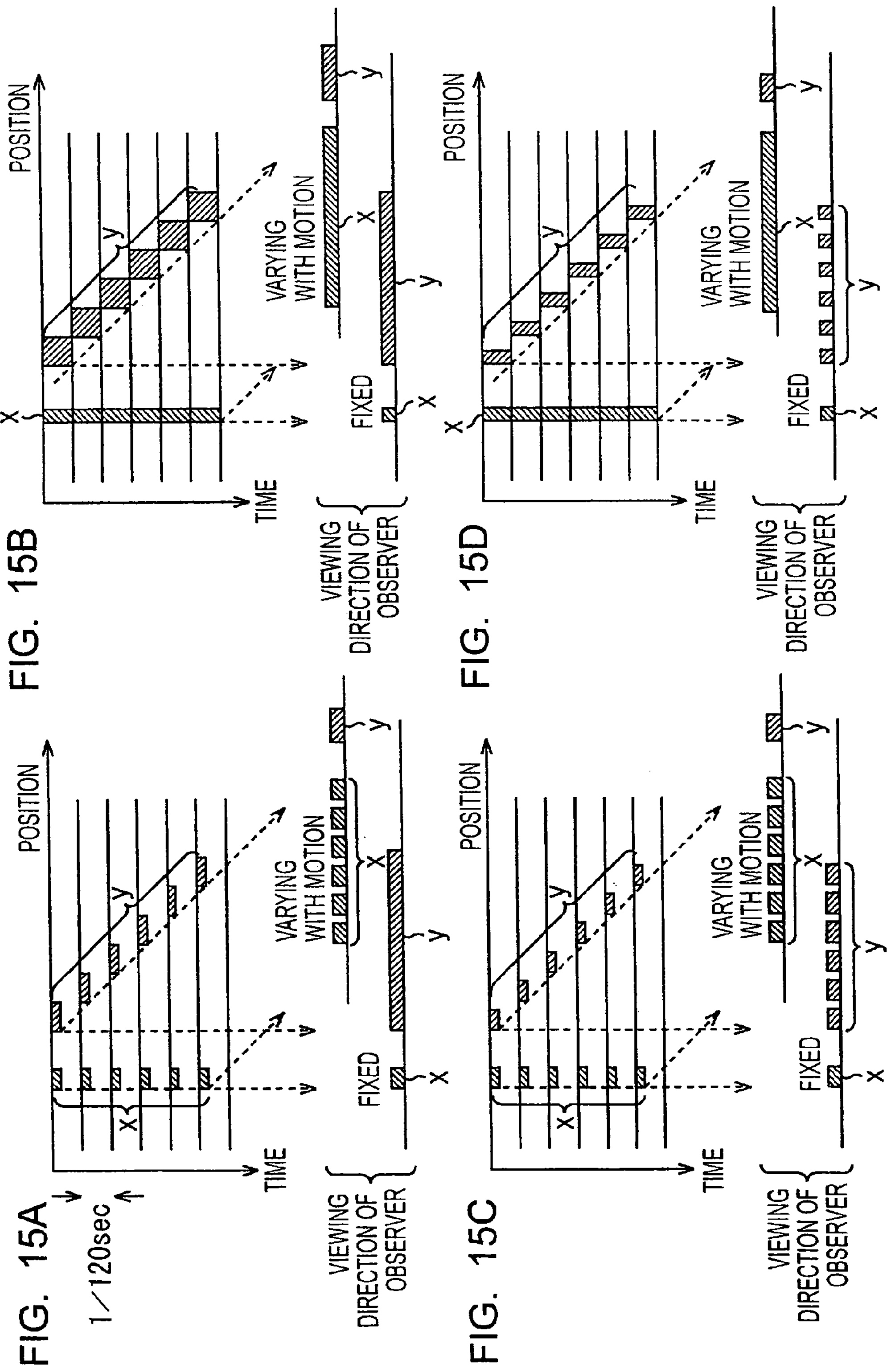
FIGS. 15A to 15D are diagram showing the manner in which images of objects displayed at a high frame rate on a screen are seen by an observer, for various conditions in terms of the image taking conditions, displaying conditions, and observing conditions.

FIG. 15A shows a manner in which the image is seen by an observer for a case in which an image is taken under an open shutter condition and the image is displayed under a pulse display condition, FIG. 15B shows a manner in which the image is seen by the observer for a case in which the image is taken under an open shutter condition and the image is displayed under a hold display condition, FIG. 15C shows a manner in which the image is seen by the observer for a case in which the image is taken under a high-speed shutter condition and the image is displayed under a pulse display condition, and FIG. 13D shows a manner in which the image is seen by the observer for a case in which the image is taken under a high-speed shutter condition and the image is displayed under a hold display condition, wherein the frame rate at which the image is taken and displayed is increased by a factor of two compared with the that used in FIGS. 13A to 13D.

As can be seen from FIGS. 15A to 15D, the blurring in the displayed images is reduced by half for all four cases. The degradation due to the stroboscopic interference is also improved, because the stereoscopic intervals increase. That is, the blurring and the stroboscopic interference are improved linearly with increasing frame rate. Furthermore, the increase in frame rate also causes a reduction in degradation in motion image quality associated with the shutter speed and the light emission period. In conclusion, the increase in frame rate is very effective to improve the motion image quality.

Motion images were actually taken under the open shutter condition, and the motion images were displayed evaluated in terms of jerkiness and motion blurring under the varying line-of-sight condition by performing a psychophysical experiment in terms of vision.

Figure 16:
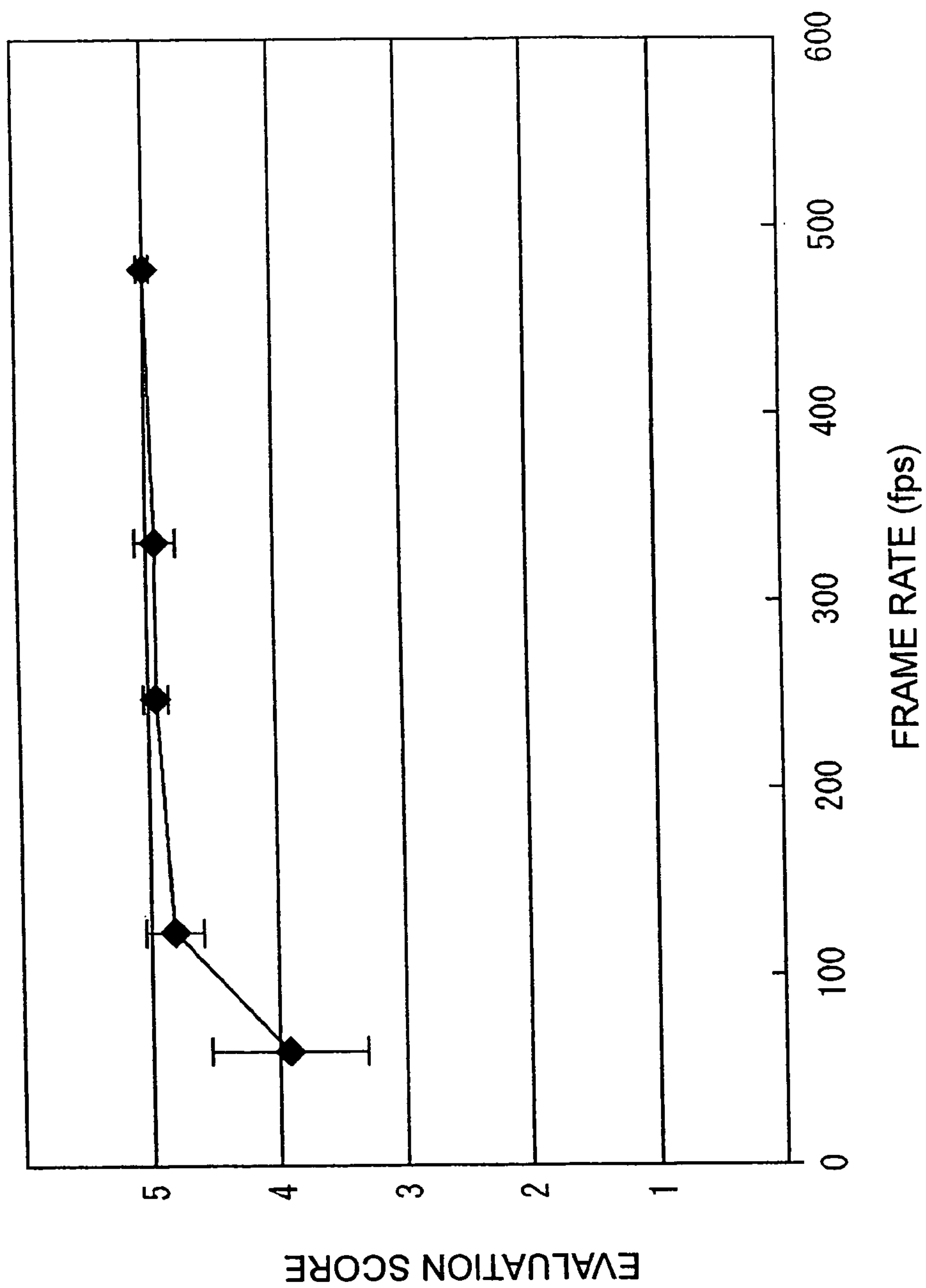
FIG. 16 is a graph showing the evaluation score in terms of jerkiness in a motion image, plotted as a function of the frame rate.
Figure 17:
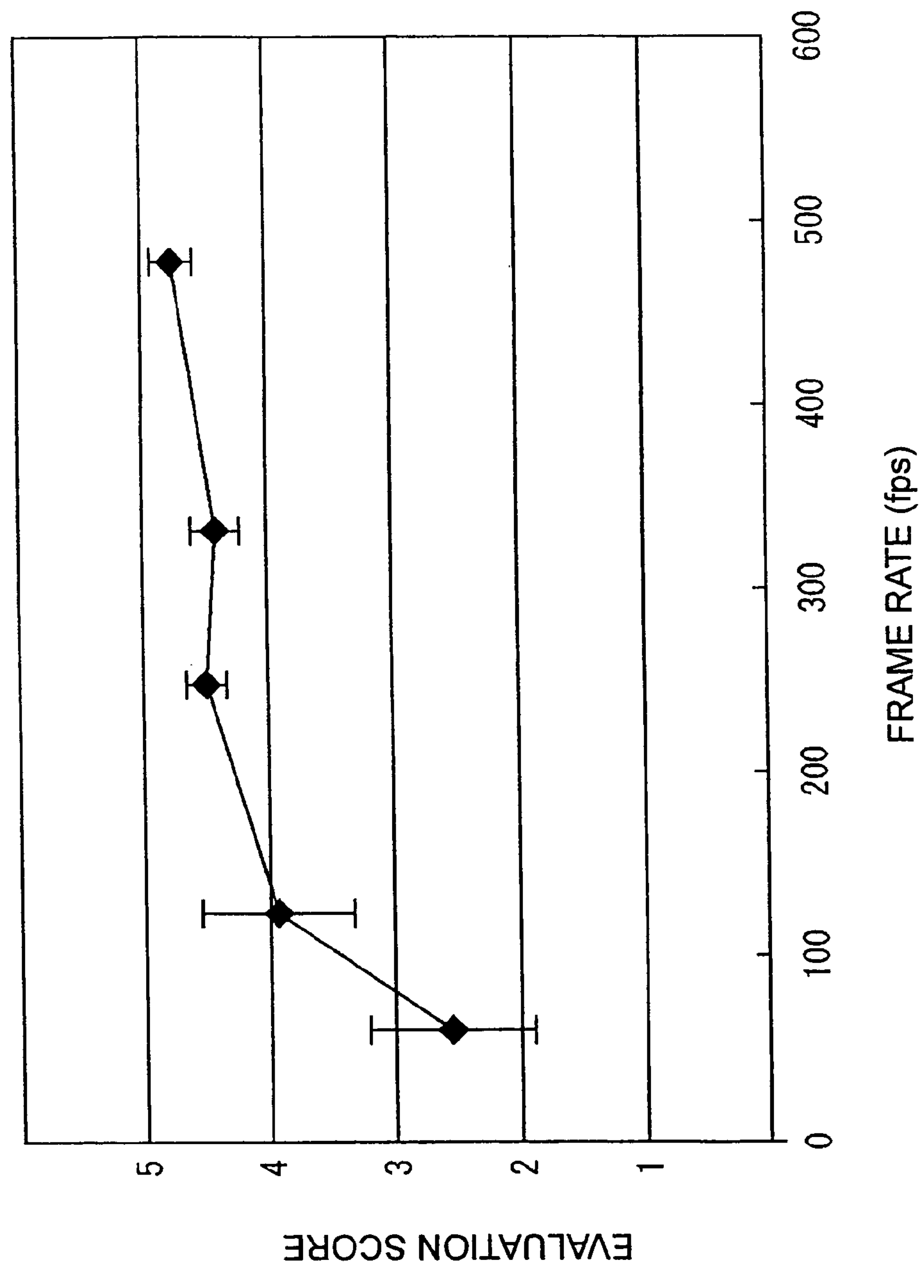
FIG. 17 is a graph showing the evaluation score in terms of motion blurring in a motion image, plotted as a function of the frame rate.

The result of the evaluation in terms of jerkiness is shown in FIG. 16, and the result of the evaluation in terms of motion blurring is shown in FIG. 17. In the psychophysical experiment, various kinds of motion images including natural moving scenes, CG images, and images taken under the open shutter condition were evaluated. The evaluation score based on degradation is defined as follows: 5 points are given when no degradation is perceived, 4 points when slight degradation is perceived, 3 points when degradation is perceived but it is not very significant, 2 points when significant degradation is perceived, and 1 point when very significant degradation is perceived. On the other hand, the score based on positive evaluation is defined as follows: 5 points are given when quality is evaluated as very good, 4 points when quality is evaluated as good, 3 points when quality is evaluated as average, 2 points when quality is evaluated as bad, and 1 point when quality is evaluated as very bad. In this experiment, evaluations were performed by as many persons as required to achieve highly reliable results. In FIGS. 16 and 17, the mean value of scores calculated over all scenes and all persons and the standard deviation are plotted as a function of the frame rate.

In contrast to jerkiness whose score is not very sensitive to the frame rate as shown in FIG. 16, the evaluation score in terms of motion blurring varies greatly depending on the frame rate as shown in FIG. 17. In both jerkiness and motion blurring, the evaluation score increases with increasing frame rate. The evaluation score in terms of the motion blurring reaches a score of 4.5 close to the upper perception limit at a frame rate of 250 fps, and the evaluation score is substantially saturated at about 4.5 for further greater frame rates. The evaluation score in terms of the jerkiness also reaches a score of 4.5 close to the upper perception limit at a frame rate of 250 fps, and the evaluation score is substantially saturated at about 4.5 for further greater frame rates.

As described above, the motion blurring in the varying line-of-sight condition, which can cause a significant degradation in motion image quality, can be improved to a sufficiently good level by increasing the frame rate to about 250 fps. That is, if the effective use of currently used video resources is taken into account, the ideal value of the frame rate is about 250 fps. Because 50 Hz or 60 Hz is employed as the frame rate in most video resources currently used, the ideal value for the frame rate is an integral multiple of 50 Hz or 60 Hz close to 250 Hz. More specifically, 240 Hz or 250 Hz is an ideal value, taking into account the effective use of video resources.

Figure 18:
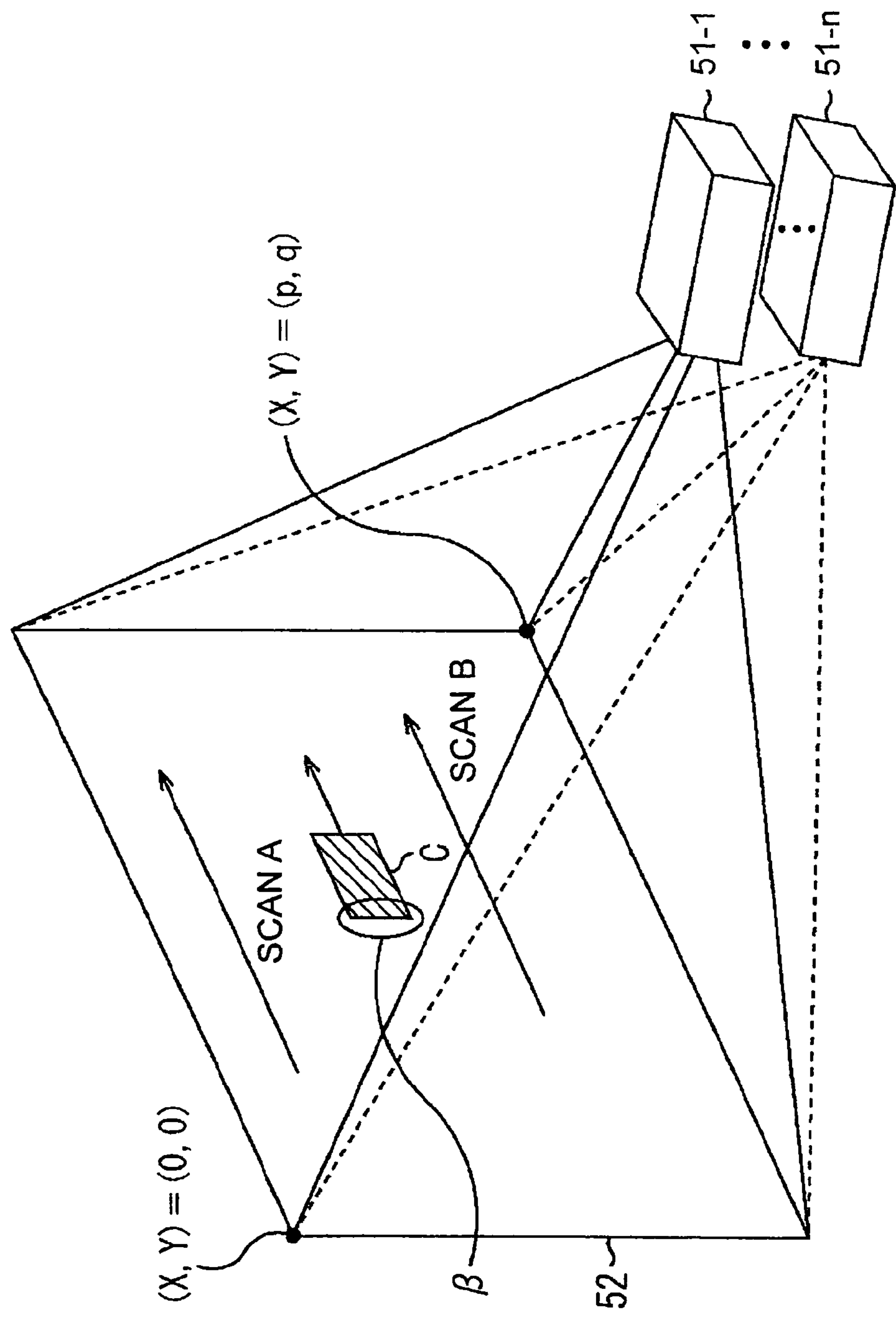
FIG. 18 is a diagram showing an example of a configuration of an image display apparatus including three or more projectors and a screen.

By using the image display system according to the present system such as that described above with reference to FIG. 1 or such as that described above with reference to FIG. 6, it is possible to display a motion image at a frame rate close to the ideal value of 250 Hz and equal to an integral multiple of 50 Hz or 60 Hz, such as 250 Hz or 240 Hz. More specifically, as shown in FIG. 18, it is possible to display a motion image at a frame rate close to the ideal value of 250 Hz and equal to an integral multiple of 50 Hz or 60 Hz, such as 250 Hz or 240 Hz, by using an image display system including two or more projectors 51-1 to 51-n according to the present invention.

Each of the projectors 51-1 to 51-n displays a frame image corresponding to the supplied video signal by scanning the screen 52 in a horizontal direction across pixels, making up the image to be displayed, from a pixel (X Y)=(0, 0) to a pixel (X, Y)=(p, q) according to the timing scheme controlled by the display controller 27. When the frame rate of a motion image input to the image display system is m Hz, each of the projectors 51-1 to 51-n displays a motion image on the screen 52 at a frame rate equal to m/n Hz. The timing of starting scanning each frame by the respective projectors 51-1 to 51-n is shifted from one projector to another by a phase of 1/n of one frame of the motion images displayed by the projectors 51-1 to 51-n, i.e., by a time of 1/m sec.

For example, when the projector 51-2 scans a line denoted by "SCAN B" on the screen 52 so as to draw a corresponding line of a frame $\alpha+1$, the projector 51-3 scans a line denoted by "SCAN A" on the screen 52 so as to draw a corresponding line of a frame $\alpha+2$. Herein, the line denoted by "SCAN B" is different in position by 1/n of the number of lines constituting one frame from the line denoted by "SCAN A". That is, the motion image displayed on the screen 52 is periodically rewritten at time intervals of 1/m in turn by a plurality of scans including the scan A and the scan B.

Figure 19:
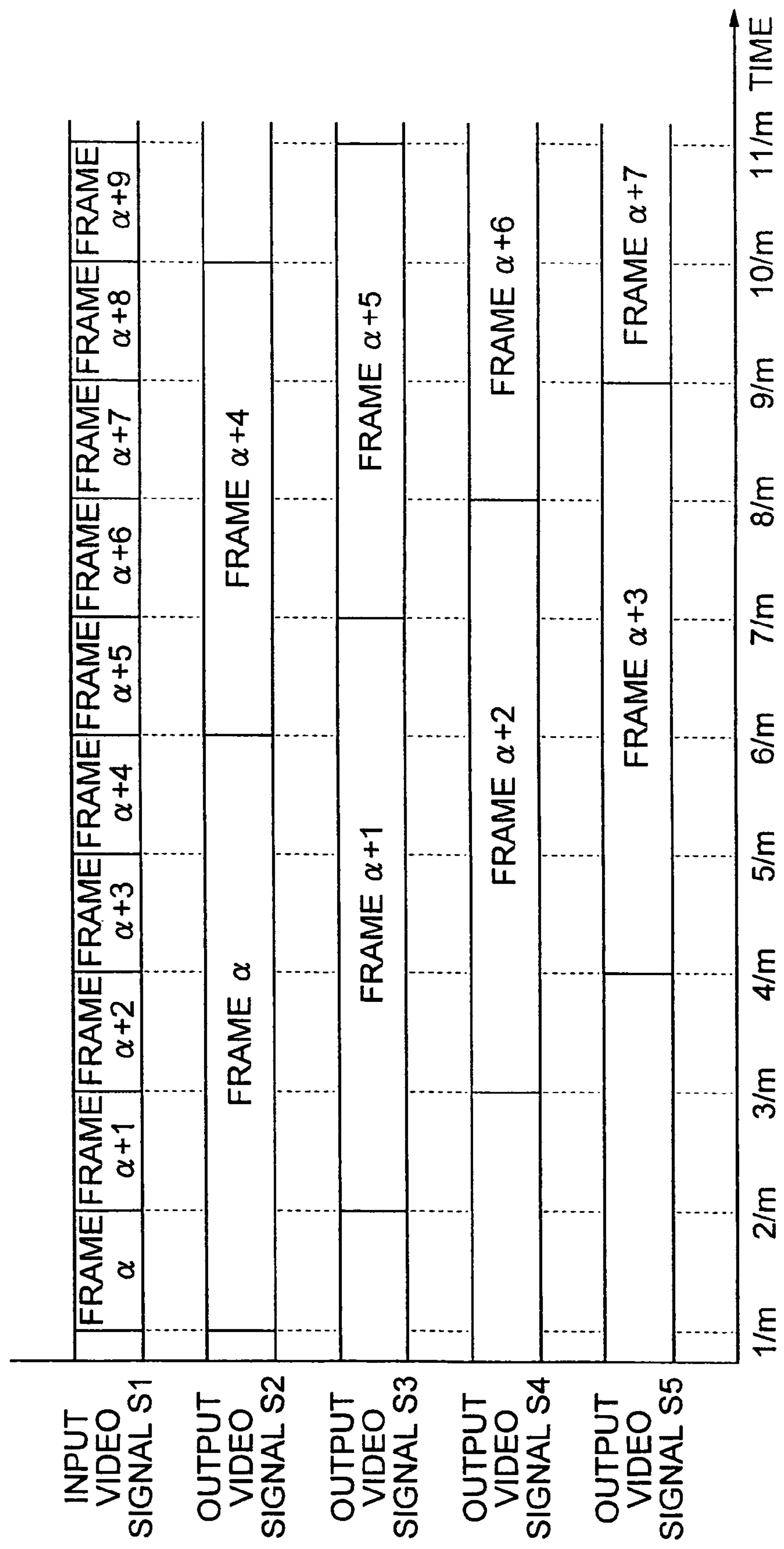
FIG. 19 is a diagram showing timings of an input video signal and output video signals for m=240 and n=4.

When the frame rate of the input image signal is 240 Hz and the input image signal is divided, for example, into four sub image signals, the image signal output from the frame memory is supplied in turn to four digital-to-analog converters or the image signal is separated by the data separator into four sub image signals and supplied in turn to four frame memories. Thus, as shown in FIG. 19, the input video signal S1 is divided into four output video signals S2, S3, S4, and S5 and supplied to respective four scan controllers.

The first scan controller controls displaying of frames α, α+4, . . . , of the output video signal S2, the second scan controller controls displaying of frames α+1, α+5, . . . , of the output video signal S3, the third scan controller controls displaying of frames α+2, α+6, . . . , of the output video signal S4, and the fourth scan controller controls displaying of frames α+3, α+7, . . . , of the output video signal S5. The four output video signals are displayed by the respective scan controllers, from the first scan controller to the fourth scan controller, at a frame rate equal to ¼ of the frame rate of the input video signal. In this operation of displaying the four output video signals, the timings of starting scanning by the respective scan controllers, from the first scan controller to the fourth scan controller, are shifted from one scan controller to another by a time equal to ¼ of the period needed to scan one frame of output video signals S2 to S5.

Figure 20:
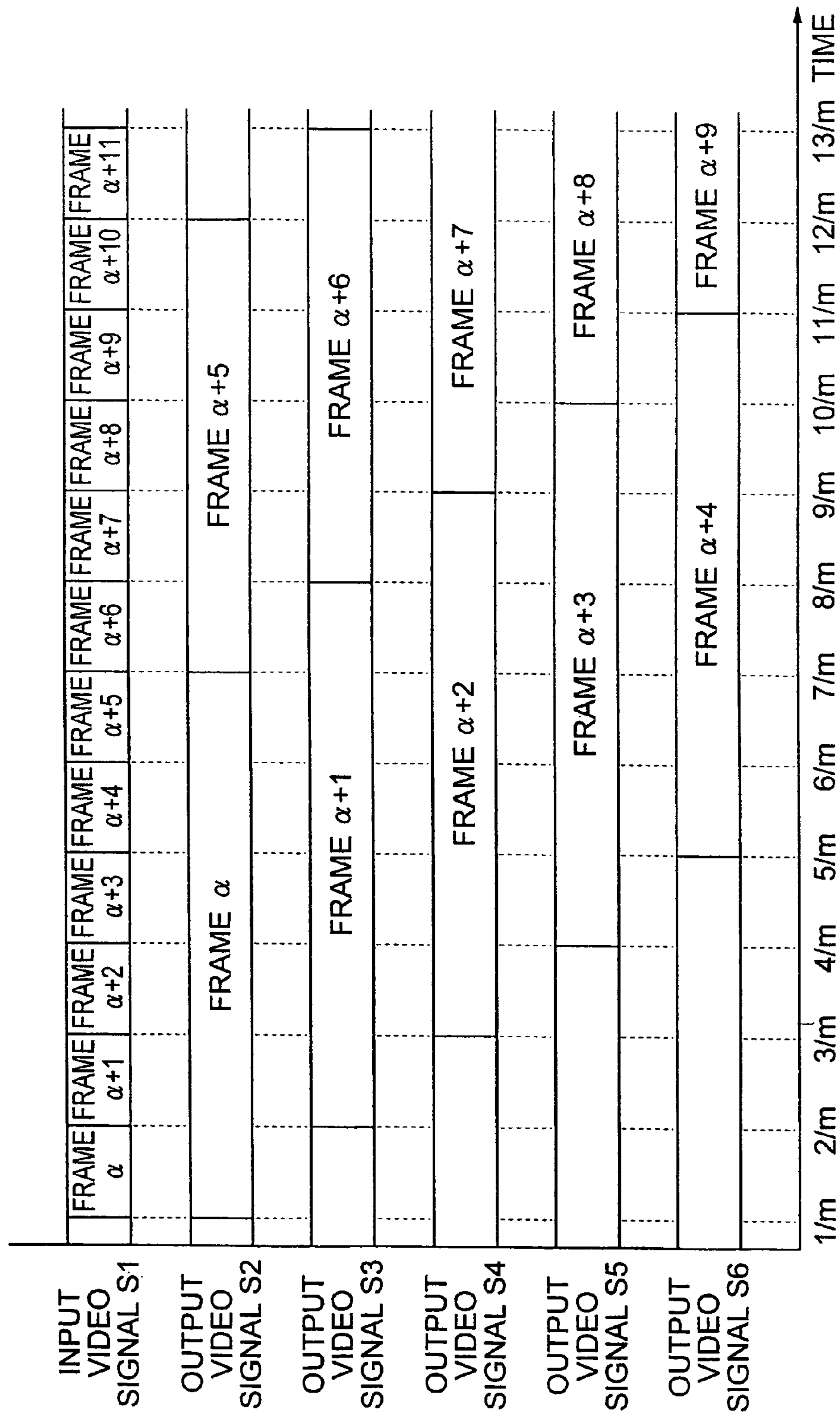
FIG. 20 is a diagram showing timings of an input video signal and output video signals for m=250 and n=5.

When the frame rate of the input image signal is 250 Hz and the input image signal is divided, for example, into five sub image signals, the image signal output from the frame memory is supplied in turn to five digital-to-analog converters or the image signal is separated by the data separator into five sub image signals and supplied in turn to five frame memories. Thus, as shown in FIG. 20, the input video signal S1 is divided into five output video signals S2, S3, S4, S5, and S6, and supplied to respective five scan controllers.

The first scan controller controls displaying of frames α, α+5, . . . , of the output video signal S2, the second scan controller controls displaying of frames α+1, α+6, . . . , of the output video signal S3, the third scan controller controls displaying of frames α+2, α+7, . . . , of the output video signal S4, the fourth scan controller controls displaying of frames α+3, α+8, . . . , of the output video signal S5, and the fifth scan controller controls displaying of frames α+4, α+9, . . . , of the output video signal S6. The five output video signals are displayed by the respective scan controllers, from the first scan controller to the fifth scan controller, at a frame rate equal to ⅕ of the frame rate of the input video signal. In this operation of displaying the four output video signals, the timings of starting scanning by the respective scan controllers, from the first scan controller to the fifth scan controller, are shifted from one scan controller to another by a time equal to ⅕ of the period needed to scan one frame of output video signals S2 to S6.

As described above, in the currently most widely used technique of displaying a motion image at a frame rate of 50 Hz or 60 Hz, significant degradation in motion image quality due to blurring or jerkiness occurs. Such degradation can be suppressed by displaying a motion image at an effective high frame rate according to the present invention. For example, when the number, n, of sub video signals into which the input video signal is divided is set to 4 or 5, an effective high frame rate can be achieve by using display devices (such as projectors) of a currently widely used type that display a motion image at a frame rate of 50 Hz or 60 Hz. For example, when the input video signal is divided into four sub video signals and the projectors 51-1 to 51-4 each display an image at a frame rate of 60 Hz, as high as 240 Hz can be achieved as the effective frame rate at which a motion image is displayed on the screen 52. On the other hand, for example, when the input video signal is divided into five sub video signals and the projectors 51-1 to 51-5 each display an image at a frame rate of 50 Hz, as high as 250 Hz can be achieved as the effective frame rate at which a motion image is displayed on the screen 52.

As described above, because 50 Hz or 60 Hz is employed as the frame rate in most video resources currently used, the ideal value of the frame rate is an integral multiple of 50 Hz or 60 Hz and close to 250 Hz. More specifically, 240 Hz or 250 Hz is an ideal value, when the effective use of video resources is taken into account.

Note that when there are provided s scan controllers, an input video signal may be divided into as many sub video signals as n<s, and a motion image may be displayed using n scan controllers of the s scan controllers.

The processes described above may be executed by means of software. In the case in which the processes are executed by means of software, a program forming the software may be installed from a storage medium or the like onto a computer which is provided as dedicated hardware or may be installed onto a general-purpose computer capable of performing various processes in accordance with various programs installed thereon.

Specific examples of storage media usable for the above purpose include, as shown in FIG. 1 or 6, a magnetic disk 31 (such as a floppy disk), an optical disk 32 (such as a CD-ROM (Compact Disk-Read Only Memory) and a DVD (Digital Versatile Disk)), a magneto-optical disk 33 (such as an MD (Mini-Disk, trademark)), and a semiconductor memory 34, in the form of a package medium in which a program is stored and which is supplied to a user separately from a computer.

In the present description, the steps described in the program may be performed either in time sequence in accordance with the order described in the program or in a parallel or separate fashion.

Note that in the present description the term "system" is used to describe a set of a plurality of apparatuses as a whole.

What is claimed is:

1. An image processing apparatus for processing an image signal to be displayed by an image display apparatus, the image processing apparatus comprising:

storage means for storing a supplied image signal with a first frame rate;

output control means for controlling outputting of the image signal stored in the storage means to a plurality of display processing areas in the image display apparatus; and display control means for controlling displaying of an image corresponding to the image signal output under the control of the output control means;

wherein, in a case in which there are provided at least n display processing areas in the image display apparatus:

the output control means controls the outputting of the image signal such that the image signal is output frame by frame from the storage means to the n display processing areas at a second frame rate equal to 1/n of the first frame rate; and the display control means controls the displaying of images corresponding to the image signal output to the n display processing areas under the control of the output control means such that images corresponding to the image signal output to the n display processing areas are displayed while a display start timing is shifted from one frame to another by 1/n of one scanning period at the second frame rate.

2. A method of processing, in an image processing apparatus including a storage unit, an image signal to be displayed by an image display apparatus, the method comprising:

a storage control step of controlling storing of an image signal with a first frame rate into the storage unit;

an output control step of controlling outputting of the image signal to a plurality of display processing areas in the image display apparatus; and a display control step of controlling displaying of an image corresponding to the image signal;

wherein, in a case in which there are provided at least n display processing areas in the image display apparatus:

in the output control step, the outputting of the image signal is controlled such that the image signal is output frame by frame from the storage unit at a second frame rate equal to 1/n of the first frame rate to the n display processing areas; and in the display control step, the displaying of images corresponding to the image signal output to the n display processing areas is controlled such that images corresponding to the image signal output to the n display processing areas are displayed while a display start timing is shifted from one frame to another by 1/n of one scanning period at the second frame rate.

3. A non-transitory storage medium including a computer-readable program stored thereon for causing a computer to execute a process on an image signal to be displayed by an image display apparatus using a storage unit, the process comprising:

a storage control step of controlling storing of an image signal with a first frame rate into the storage unit;

an output control step of controlling outputting of the image signal to a plurality of display processing areas in the image display apparatus; and a display control step of controlling displaying of an image corresponding to the image signal;

wherein, in a case in which there are provided at least n image display processing areas in the image display apparatus:

in the output control step, the outputting of the image signal is controlled such that the image signal is output frame by frame from the storage unit at a second frame rate equal to 1/n of the first frame rate to the n display processing areas; and in the display control step, the displaying of images corresponding to the image signal output to the n display processing areas is controlled such that images corresponding to the image signal output to the n display processing areas are displayed while a display start timing is shifted from one frame to another by 1/n of one scanning period at the second frame rate.

* * * * *